United States Patent

Raheja et al.

(10) Patent No.: US 12,492,177 B2
(45) Date of Patent: Dec. 9, 2025

(54) RAR-α COMPOUNDS FOR INFLAMMATORY DISEASE AND MALE CONTRACEPTION

(71) Applicant: Orphagen Pharmaceuticals, Inc., San Diego, CA (US)

(72) Inventors: Raj Kumar Raheja, Poway, CA (US); Paul Damian Crowe, Encinitas, CA (US); Haiyan Tao, San Diego, CA (US); Scott McNear Thacher, San Diego, CA (US)

(73) Assignee: ORPHAGEN PHARMACEUTICALS, INC., San Diego, CA (US)

( * ) Notice: Subject to any disclaimer, the term of this patent is extended or adjusted under 35 U.S.C. 154(b) by 782 days.

(21) Appl. No.: 17/786,399

(22) PCT Filed: Dec. 17, 2020

(86) PCT No.: PCT/US2020/065719
§ 371 (c)(1),
(2) Date: Jun. 16, 2022

(87) PCT Pub. No.: WO2021/127250
PCT Pub. Date: Jun. 24, 2021

(65) Prior Publication Data
US 2023/0357175 A1 Nov. 9, 2023

Related U.S. Application Data

(60) Provisional application No. 62/950,473, filed on Dec. 19, 2019.

(51) Int. Cl.
C07D 311/58 (2006.01)
A61P 15/16 (2006.01)
A61P 35/00 (2006.01)
C07D 405/04 (2006.01)
C07D 407/04 (2006.01)

(52) U.S. Cl.
CPC ............ C07D 311/58 (2013.01); A61P 15/16 (2018.01); A61P 35/00 (2018.01); C07D 405/04 (2013.01); C07D 407/04 (2013.01)

(58) Field of Classification Search
CPC .. C07D 311/58; C07D 405/04; C07D 407/04; A61P 15/16; A61P 35/00
See application file for complete search history.

(56) References Cited

U.S. PATENT DOCUMENTS

| 5,877,207 A | 3/1999 | Klein et al. |
| 2004/0077710 A1 | 4/2004 | Chandraratna et al. |
| 2007/0054882 A1 | 3/2007 | Klein et al. |

FOREIGN PATENT DOCUMENTS

| CN | 107250112 A | 10/2017 | |
| EP | 1920771 A2 | 5/2008 | |
| JP | 2022507204 A | 1/2022 | |
| WO | WO-8705297 A1 | 9/1987 | |
| WO | WO-0019990 A2 | 4/2000 | |
| WO | WO-2016055800 A2 | 4/2016 | |
| WO | WO-2017201200 A1 | 11/2017 | |
| WO | WO-2019099949 A1 * | 5/2019 | ....... C07K 14/70567 |
| WO | WO-2020106199 A1 | 5/2020 | |
| WO | WO-2021127250 A1 | 6/2021 | |

OTHER PUBLICATIONS

Jetson, Rachael, et al. "Practical synthesis of a chromene analog for use as a retinoic acid receptor alpha antagonist lead compound." European journal of medicinal chemistry 63 (2013): 104-108. (Year: 2013).*
Aoyama et al. Inhibiting retinoic acid signaling ameliorates graft-versus-host disease by modifying T-cell differentiation and intestinal migration. Blood 122:2125-2134 (2013).
Arthos et al. The Role of Integrin alpha4beta7 in HIV Pathogenesis and Treatment. Curr HIV/AIDS Rep 15:127-135 (2018).
Chen et al. A critical role for the retinoic acid signaling pathway in the pathophysiology of gastrointestinal graft-versus-host disease. Blood 121:3970-3980 (2013).
Chung et al. Oral administration of a retinoic acid receptor antagonist reversibly inhibits spermatogenesis in mice. Endocrinology 152:2492-2502 (2011).
Chung et al. Pharmacological activity of retinoic acid receptor alpha-selective antagonists in vitro and in vivo. ACS Med. Chem. Lett. 4:446-450 (2013).
Chung et al. Prolonged Oral Administration of a Pan-Retinoic Acid Receptor Antagonist Inhibits Spermatogenesis in Mice With a Rapid Recovery and Changes in the Expression of Influx and Efflux Transporters. Endocrinology 157:1601-1612 (2016).
Chung et al. Retinoic acid receptor a is required for synchronization of spermatogenic cycles and its absence results in progressive breakdown of the spermatogenic process. Dev. Dyn. 230:754-766 (2004).

(Continued)

*Primary Examiner* — Joseph K McKane
*Assistant Examiner* — Quincy McKoy
(74) *Attorney, Agent, or Firm* — WILSON SONSINI GOODRICH & ROSATI

(57) ABSTRACT

Modulators of retinoid acid receptor-alpha (RARα) of formula (I) are provided herein, as well as pharmaceutical compositions and methods relating thereto.

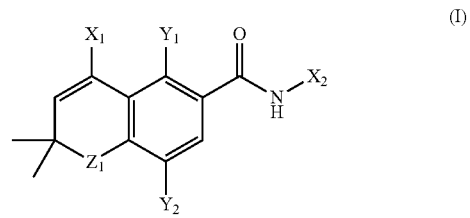

18 Claims, No Drawings

(56) References Cited

OTHER PUBLICATIONS

Clagett-Dame et al. Vitamin A in Reproduction and Development. Nutrients 3:385-428 (2011).
Coombes et al. A functionally specialized population of mucosal CD103+ DCs induces Foxp3+ regulatory T cells via a TGF-beta and retinoic acid-dependent mechanism. J Exp Med 204:1757-1764 (2007).
Crockett et al. Isotretinoin use and the risk of inflammatory bowel disease: a case-control study. Am J Gastroenterol 105:1986-1993 (2010).
Daponte et al. Retinoid receptor alpha and Beta expression in serous ovarian tumors. Oncology 73:81-89 (2007).
Depaolo et al. Co-adjuvant effects of retinoic acid and IL-15 induce inflammatory immunity to dietary antigens. Nature 471:220-224 (2011).
Diana et al. Emerging Role of Vedolizumab in Managing Refractory Immune Checkpoint Inhibitor-Induced Enteritis. ACG Case Rep J 5:e17 (2018).
Dodge et al. Effects of Donor Vitamin A Deficiency and Pharmacologic Modulation of Donor T Cell Retinoic Acid Pathway on the Severity of Experimental Graft-versus-Host Disease. Biology of blood and marrow transplantation: journal of the American Society for Blood and Marrow Transplantation 22:2141-2148 (2016).
Eksteen et al. Gut homing receptors on CD8 T cells are retinoic acid dependent and not maintained by liver dendritic or stellate cells. Gastroenterology 137:320-329 (2009).
Fransen et al. Polymorphism in the retinoic acid metabolizing enzyme CYP26B1 and the development of Crohn's Disease. PLoS One 8:e72739 (2013).
Galvin et al. Blocking retinoic acid receptor-alpha enhances the efficacy of a dendritic cell vaccine against tumours by suppressing the induction of regulatory T cells. Cancer Immunol Immunother 62:1273-1282 (2013).
Guo et al. A retinoic acid-rich tumor microenvironment provides clonal survival cues for tumor-specific CD8(+) T cells. Cancer Res 72:5230-5239 (2012).
Guo et al. Dissecting the role of retinoic acid receptor isoforms in the CD8 response to infection. J Immunol 192:3336-3344 (2014).
Guo et al. Leukocyte homing, fate, and function are controlled by retinoic acid. Physiol Rev 95:125-148 (2015).
Hall et al. Essential Role for Retinoic Acid in the Promotion of CD4+ T Cell Effector Responses via Retinoic Acid Receptor Alpha. Immunity 34:435-447 (2011).
Heller et al. Suppression of Spermatogenesis and Chronic Toxicity in Men by a New Series of Bis(dichloroacetyl) Diamines. Toxicol. Appl. Pharm. 3:1-11 (1961).
Hill et al. Retinoic acid enhances Foxp3 induction indirectly by relieving inhibition from CD4+CD44hi Cells. Immunity 29:758-770 (2008).
Hong et al. beta-catenin promotes regulatory T-cell responses in tumors by inducing vitamin A metabolism in dendritic cells. Cancer Res 75:656-665 (2015).
Hsieh et al. Vedolizumab: a novel treatment for ipilimumab-induced colitis. BMJ Case Rep 2016:bcr2016216641 (2016).
Iwata et al. Retinoic acid imprints gut-homing specificity on T cells. Immunity 21:527-538 (2004).
Kang et al. High and low vitamin A therapies induce distinct FoxP3+ T-cell subsets and effectively control intestinal inflammation. Gastroenterology 137:1391-1402e1-6 (2009).
Klein et al. Identification and functional separation of retinoic acid receptor neutral antagonists and inverse agonists. J Biol Chem. 271:22692-22696 (1996).
Lopalco et al. Update on the Medical Management of Gastrointestinal Behcet's Disease. Mediators Inflamm 2017:1460491 (2017).
Lufkin et al. High postnatal lethality and testis degeneration in retinoic acid receptor alpha mutant mice. PNAS USA. 90:7225 (1993).
Napoli. Physiological insights into all-trans-retinoic acid biosynthesis. Biochim Biophys Acta 1821:152-167 (2012).
Navarini et al. Vedolizumab as a successful treatment of CTLA-4-associated autoimmune enterocolitis. J Allergy Clin Immunol 139:1043-1046e5 (2017).
Nawaz et al. MAdCAM costimulation through Integrin-alpha4beta7 promotes HIV replication. Mucosal Immunol 11(5):1342-1351 (2018).
Nema et al. Excipients and their role in approved injectable products: current usage and future directions. PDA J Pharm Sci Technol 65(3):287-332 (2011).
Paul et al. Soluble Mucosal Addressin Cell Adhesion Molecule 1 and Retinoic Acid are Potential Tools for Therapeutic Drug Monitoring in Patients with Inflammatory Bowel Disease Treated with Vedolizumab: A Proof of Concept Study. J Crohns Colitis 12(9):1089-1096 (2018).
PCT/US2020/065719 International Search Report and Written Opinion dated Mar. 16, 2021.
Powell et al. Compendium of excipients for parenteral formulations. PDA J Pharm Sci Technol. 52:238-311 (1998).
Sanders et al. Increased production of retinoic acid by intestinal macrophages contributes to their inflammatory phenotype in patients with Crohn's disease. Gastroenterology 146:1278-1288e (2014).
Schambach et al. Activation of retinoic acid receptor-a favours regulatory T cell induction at the expense of IL-17-secreting T helper cell differentiation. EU J Immunol 37:2396-2399 (2007).
Sivro et al. Integrin alpha4beta7 expression on peripheral blood CD4(+) T cells predicts HIV acquisition and disease progression outcomes. Sci Transl Med 10(425):eaam6354 (2018).
Stevison et al. Inhibition of the all-trans Retinoic Acid (atRA) Hydroxylases CYP26A1 and CYP26B1 Results in Dynamic, Tissue-Specific Changes in Endogenous atRA Signaling. Drug Metab Dispos 45:846-854 (2017).
Teng et al., Identification of highly potent retinoic acid receptor alpha-selective antagonists. J. Med. Chem. 40:2445-2451 (1997).
Thacher et al. Cell type and gene-specific activity of the retinoid inverse agonist AGN 193109: divergent effects from agonist at retinoic acid receptor gamma in human keratinocytes. Cell Growth Differ. 10:255-62 (1999).
Thacher et al. Therapeutic applications for ligands of retinoid receptors. Current pharmaceutical design 6:25-58 (2000).
Uzzan et al. Anti-α4β7 therapy targets lymphoid aggregates in the gastrointestinal tract of HIV-1-infected individuals. Sci. Transl. Med. 10(461):eaau4711 (2018).
Van Der Leede et al. Immunohistochemical analysis of retinoic acid receptor-alpha in human breast tumors: retinoic acid receptor-alpha expression correlates with proliferative activity. Am J Pathol 148:1905-1914 (1996).
Villablanca et al. Competitive homing assays to study gut-tropic t cell migration. J Vis Exp. (49):2619 (2011).
Westerveld et al. Vedolizumab: a novel medical intervention in the treatment of primary sclerosing cholangitis. BMJ Case Rep 2017:bcr2017220351 (2017).
Wolbach et al. Tissue Changes Following Deprivation of Fat-Soluble A Vitamin. J. Exp. Med. 42:753 (1925).

* cited by examiner

RAR-α COMPOUNDS FOR INFLAMMATORY DISEASE AND MALE CONTRACEPTION

INCORPORATION BY REFERENCE TO ANY PRIORITY APPLICATIONS

Any and all applications for which a foreign or domestic priority claim is identified, for example, in the Application Data Sheet or Request as filed with the present application, are hereby incorporated by reference under 37 CFR 1.57 and Rules 4.18 and 20.6, such as U.S. Provisional Application No. 62/950,473, filed Dec. 19, 2019, which is hereby incorporated by reference in its entirety.

BACKGROUND

Field

The present patent application is directed to novel compounds which may be useful as retinoid acid receptor-alpha (RARα) modulators.

Description of the Related Technology

All-trans retinoic acid (atRA), the major biologically active metabolite of the essential nutrient vitamin A (retinol), plays an important role in a wide spectrum of biological activities including embryogenesis, maintenance of skin and epithelial cells, and homeostasis of the immune system (Clagett-Dame & Knutson, 2011). The main source of atRA in humans is de novo synthesis from dietary precursors. Dietary vitamin A is absorbed via intestinal epithelial cells and stored in the liver as retinyl esters which are processed for transport to target tissues where they are hydrolyzed to retinol. Retinol is metabolized to atRA in two successive hydrolysis steps. First, retinaldehyde is formed by ubiquitous alcohol dehydrogenases (ADHs). Next, cell-specific retinaldehyde dehydrogenases (RALDHs) hydrolyze retinaldehyde to atRA (Napoli, 2012). The unique expression of RALDH by only certain cell types defines and limits the range of action of atRA. Newly synthesized atRA can remain in the cell and bind to cellular atRA-binding proteins (CRABPs) that either target atRA for degradation or transport to the nucleus where it binds the retinoic acid receptors (RAR), including RARα, RARβ and RARγ. Alternatively, atRA can leave the cell and freely diffuse into nearby cells or enter the plasma and circulate throughout the body. Degradation of atRA to various oxidized metabolites occurs mainly through tissue-specific expression of enzymes of the CYP26 family (Stevison, Hogarth, Tripathy, Kent & Isoherranen, 2017).

atRA evokes cellular responses by binding RARs, transcription factors which belong to the steroid hormone nuclear receptor superfamily RARs, in turn, bind to DNA as a heterodimer with one of the retinoid X receptors (RXRs) in DNA regions called retinoic acid response elements (RAREs). atRA binding to RARs alters the conformation of the receptor, thereby affecting the binding of coregulatory proteins that either induce or repress transcription of nearby target genes. The RAR family consists of three members, RAR alpha (RARα), RAR beta (RARβ) and RAR gamma (RARγ), also known as NR1B1, NR1B2 and NR1B3 respectively (and each encoded by a separate gene RARA, RARB and RARC, respectively). RARs contain four principal domains shared by the majority of nuclear receptors: an N-terminal A/B domain, a DNA-binding domain, a hinge domain, and a ligand binding domain. Each RAR gene generates several isoforms which differ only in their N-terminal A/B domain. These receptor subtypes have separate tissue distributions and, by means of individual gene deletion studies, are shown to have different functions (Thacher, Vasudevan & Chandraratna, 2000).

The receptor-mediated effects of atRA are critically dose-dependent and thus, tissue-specific regulation of atRA synthesis is important for the temporal and spatial control of local concentration gradients. For example, following antigen capture in the small intestine, a specialized subset of dendritic cells (DC) expressing RALDH migrates to mesenteric lymph nodes (MLN) where they secrete high levels of atRA while presenting antigen to naïve lymphocytes. atRA induces expression of the gut-homing molecules integrin α4β7 and C—C chemokine receptor type 9 (CCR9) on antigen-stimulated T and B cells, enabling their interaction with the mucosal addressin adhesion molecule-1 (MAdCAM-1) or the chemokine, CCL25, respectively (Guo, Brown, Ortiz & Noelle, 2015). atRA synthesis in MLN also augments the expression of the lineage specific transcription factor forkhead box P3 (FoxP3) in naïve or committed CD4+ T cells to generate peripherally-induced regulatory T cells (pTreg), a T lymphocyte subtype that suppresses inflammatory responses to self-antigens and to dietary antigens (Coombes et al., 2007; Iwata, Hirakiyama, Eshima, Kagechika, Kato & Song, 2004; Kang, Wang, Matsumoto & Kim, 2009).

In the immune system, the effects of atRA appear to be mediated primarily by RARα. RARα is the major RAR subtype expressed in naïve CD4+ T lymphocytes (Hall et al., 2011; Hill et al., 2008), and it is markedly upregulated during T cell activation in the presence of transforming growth factor-β (Schambach, Schupp, Lazar & Reiner, 2007). Deletion of RARα in mice mimics many of the effects of Vitamin A deprivation in the immune system. For example, atRA-stimulated formation of pTregs and upregulation of integrin α4β7 expression is abrogated in RARα knockout mice but not in RARβ or RARγ knockout mice (Hill et al., 2008). Likewise, lineage specific deletion of RARα, but not RARβ or RARγ, in mouse CD8+ T cells abrogates atRA-induced α4β7 and CCR9 expression in vitro (Guo, Brown, Ortiz & Noelle, 2015; Guo, Lee, Brown, Zhang, Usherwood & Noelle, 2014).

Mammalian spermatogenesis is also regulated by spatiotemporal control of atRA metabolism and signaling in the testes (Endo et al., 2017). Vitamin A deprivation (Wolbach and Howe, 1925), inhibition of atRA synthesis with a RALDH inhibitor (Heller, Moore & Paulsen, 1961) or targeted deletion of RARα in mice (Lufkin, et al., 1993; Chung, Sung, Wang & Wolgemuth, 2004) all disrupt spermatogenesis. Likewise, oral administration of a pan-RAR antagonist in mice and rabbits reversibly disrupts spermatogenesis with failure of spermatid alignment and release, impairing fertility (Chung et al., 2011; Chung, Wang & Wolgemuth, 2016). RARα-selective antagonists have been identified that inhibit spermatogenesis when administered via intravenous but not oral dosing (Chung, et al., 2013).

SUMMARY

Development of RARα modulators may be a promising avenue for new therapeutic compounds that regulate the immune system. As one example, an RARα antagonist could be therapeutically effective in diseases where α4β7 is thought to be involved since the antagonist would be expected to block the induction of α4β7 expression in a therapeutic environment. Specifically, the therapeutic monoclonal antibody vedolizumab binds to α4β7 and is effective in treating inflammatory bowel disease (IBD), autoimmune-induced enterocolitis, and primary sclerosing cholangitis (Diana, et el., 2018; Paul, Williet et al., 2018; Westerveld, Grajo et al., 2017) Immune cells that express α4β7 are reported to be early targets of the immunodeficiency virus HIV-1, and inhibition of α4P7 has been tested as an antiviral therapy (Uzzan, Tokuyama, Rosenstein, Tomescu, Sah-Bandar, et al., 2018). Inhibition of RARα by a small molecule antagonist may be an attractive approach for treatment of inflammatory disease of the bowel or infection by HIV. In addition, inhibition of RARα by a small molecule antagonist may be an attractive approach for development of a reversible, oral male contraceptive.

Various embodiments of the present invention provide small molecule antagonists of RARα that are capable of suppressing the transcriptional activity of the alpha isoform of the retinoic acid receptors (RARα). Some of these modulators are selective antagonists of RARα but not RARβ and RARγ. In turn, these antagonists may be used in patients and experimental animals to regulate immune cell function while minimizing the regulation of RARβ and RARγ, thereby reducing the spectrum of possible side effects in other tissues or organs of the body, ameliorating various pathologic phenotypes, in particular chronic and/or acute inflammatory diseases, preferably Crohn's Disease, Ulcerative Colitis, pathologies involving the immune system, cancer, viral infection, and graft-versus-host disease.

Some embodiments provide a compound of formula (I):

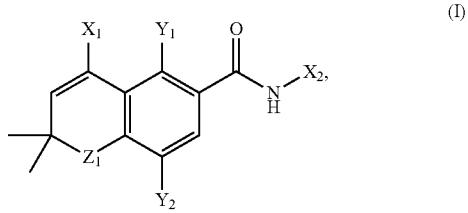

or a pharmaceutically acceptable salt, ester or tautomer thereof,
wherein:
$X_1$ is $C_{1-6}$alkyl, 3-10 membered heterocycloalkyl, or $C_{3-8}$cycloalkyl, each optionally substituted with one to three $R^A$;
$X_2$ is $C_{6\ or\ 10}$aryl, 5-10 membered heteroaryl, 3-10 membered heterocycloalkyl, or $C_{3-8}$cycloalkyl, each optionally substituted with one to four $R^B$, where when $X_1$ is phenyl substituted with methyl, then $X_2$ is substituted with —C(=O)OH or —C(=O)NH$_2$ and one to three $R^B$;
each $R^A$ is independently halo, cyano, —C(=O)NH$_2$, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, or substituted 3-10 membered heterocycloalkyl;
each $R^B$ is independently bromo, chloro, cyano, —C(=O)NH$_2$, —C(=O)OH, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, substituted 3-10 membered heterocycloalkyl, or an acidic moiety;
$Y_1$ is hydrogen, unsubstituted $C_{1-6}$alkyl or substituted $C_{1-6}$alkyl;
$Y_2$ is halo, cyano, unsubstituted $C_{1-6}$alkyl, unsubstituted $C_{1-6}$alkoxy, or substituted $C_{1-6}$alkoxy;
$Z_1$ is O (oxygen), S (sulfur), or $NR^C$; and $R^C$ is hydrogen, unsubstituted $C_{1-6}$alkyl or substituted $C_{1-6}$alkyl.

In some embodiments, the compound of formula (I) is further defined as a compound of formula (Ia):

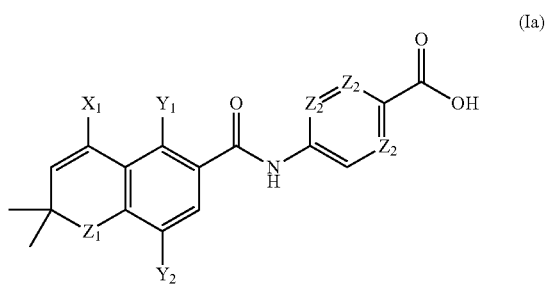

or a pharmaceutically acceptable salt, ester or tautomer thereof,
wherein each $Z_2$ is independently N (nitrogen), CH or $CR^B$.

Some embodiments provide a compound of formula (II):

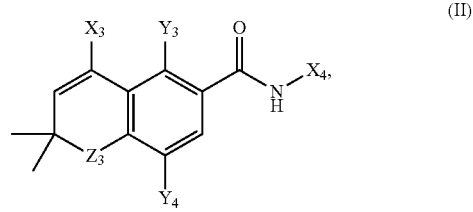

or a pharmaceutically acceptable salt, ester or tautomer thereof,
wherein:
$X_3$ is 3-10 membered heterocycloalkyl, or $C_{3-8}$cycloalkyl, each optionally substituted with one to three $R^E$;
$X_4$ is $C_{6\ or\ 10}$aryl, 5-10 membered heteroaryl, 3-10 membered heterocycloalkyl, or $C_{3-8}$cycloalkyl, each optionally substituted with one to three $R^F$;
each $R^E$ is independently halo, cyano, —C(=O)NH$_2$, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, or substituted 3-10 membered heterocycloalkyl;
each $R^F$ is independently halo, cyano, —C(=O)OH, —C(=O)NH$_2$, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, substituted 3-10 membered heterocycloalkyl or an acidic moiety;

$Y_3$ is hydrogen, unsubstituted $C_{1-6}$alkyl or substituted $C_{1-6}$alkyl;

$Y_4$ is halo, cyano, unsubstituted $C_{1-6}$alkyl, unsubstituted $C_{1-6}$alkoxy, or substituted $C_{1-6}$alkoxy;

$Z_3$ is O (oxygen), S (sulfur), or $NR^G$; and $R^G$ is hydrogen, unsubstituted $C_{1-6}$alkyl or substituted $C_{1-6}$alkyl.

In some embodiments, the compound of formula (II) is further defined as:

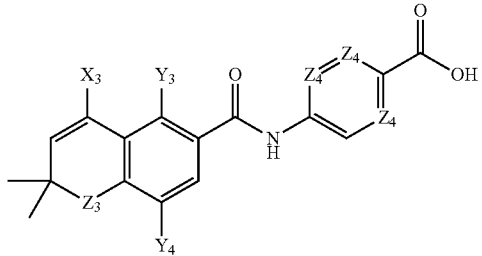

or a pharmaceutically acceptable salt, ester or tautomer thereof, wherein each $Z_4$ is independently N (nitrogen), CH or $CR^D$.

Some embodiments provide a compound of formula (III):

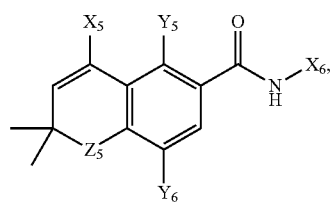

(III)

or a pharmaceutically acceptable salt, ester or tautomer thereof, wherein:

$X_5$ is $C_{1-6}$alkyl, $C_{2-6}$alkenyl, $C_{2-6}$alkynyl, 3-10 membered heterocycloalkyl, or $C_{3-8}$cycloalkyl, each optionally substituted with one to three $R^H$;

$X_6$ is $C_{6\ or\ 10}$aryl, 5-10 membered heteroaryl, 3-10 membered heterocycloalkyl, or $C_{3-8}$cycloalkyl, each optionally substituted with one to three $R^J$;

each $R^H$ is independently halo, cyano, —C(=O)NH$_2$, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, or substituted 3-10 membered heterocycloalkyl;

each $R^J$ is independently halo, cyano, —C(=O)OH, —C(=O)NH$_2$, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, substituted 3-10 membered heterocycloalkyl or an acidic moiety;

$Y_5$ is hydrogen, unsubstituted $C_{1-6}$alkyl or substituted $C_{1-6}$alkyl;

$Y_6$ is halo, cyano, unsubstituted $C_{1-6}$alkyl, unsubstituted $C_{1-6}$alkoxy, or substituted $C_{1-6}$alkoxy;

$Z_5$ is O (oxygen), S (sulfur), or $NR^K$; and $R^K$ is hydrogen, unsubstituted $C_{1-6}$alkyl or substituted $C_{1-6}$alkyl.

In some embodiments, the compound of formula (III) is further defined as:

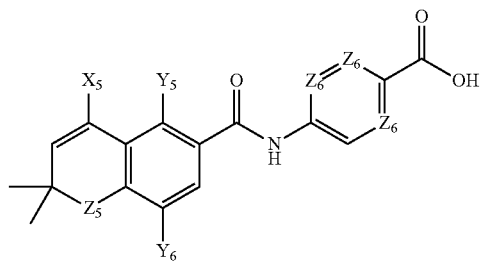

or a pharmaceutically acceptable salt, ester or tautomer thereof, wherein:

each $Z_6$ is independently N (nitrogen), CH or CRI, where at least one $Z_6$ is N (nitrogen).

Some embodiments provide a compound of formula (IV):

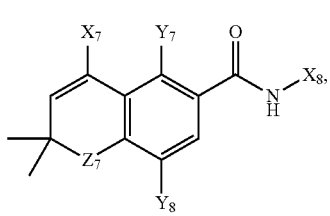

(IV)

or a pharmaceutically acceptable salt, ester or tautomer thereof, wherein:

$X_7$ is 3-10 membered heterocycloalkyl, or $C_{3-8}$cycloalkyl, each optionally substituted with one to three $R^L$;

$X_8$ is $C_{6\ or\ 10}$aryl, 5-10 membered heteroaryl, 3-10 membered heterocycloalkyl, or $C_{3-8}$cycloalkyl, each optionally substituted with one to four $R^M$, where when $X_1$ is phenyl substituted with methyl, then $X_2$ is substituted with —C(=O)OH or —C(=O)NH$_2$ and one to three $R^M$;

each $R^L$ is independently halo, cyano, —C(=O)NH$_2$, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, or substituted 3-10 membered heterocycloalkyl;

each $R^M$ is independently fluoro, bromo, chloro, cyano, —C(=O)NH$_2$, —C(=O)OH, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, substituted 3-10 membered heterocycloalkyl, or an acidic moiety;

$Y_7$ is hydrogen, unsubstituted $C_{1-6}$alkyl or substituted $C_{1-6}$alkyl;

$Y_8$ is halo, cyano, unsubstituted $C_{1-6}$alkyl, unsubstituted $C_{1-6}$alkoxy, or substituted $C_{1-6}$alkoxy;

$Z_1$ is O (oxygen), S (sulfur), or $NR^N$; and $R^N$ is hydrogen, unsubstituted $C_{1-6}$alkyl or substituted $C_{1-6}$alkyl. In some embodiments, each $R^B$ is independently bromo, chloro, cyano, —C(=O)OH, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, substituted 3-10 membered heterocycloalkyl, or an acidic moiety.

In some embodiments, the compound of formula (IV) is further defined as:

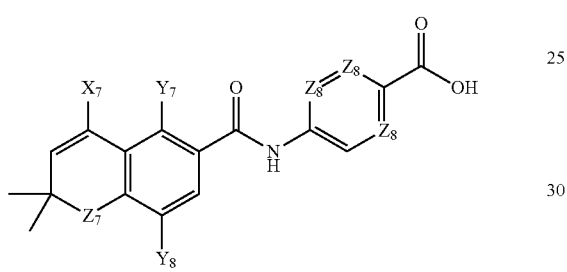

or a pharmaceutically acceptable salt, ester or tautomer thereof, wherein each $Z_8$ is independently N (nitrogen), CH or $CR^M$, where at least one $Z_8$ is N (nitrogen).

In some embodiments, each $R^M$ is independently bromo, chloro, cyano, —C(=O)NH$_2$, —C(=O)OH, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, substituted 3-10 membered heterocycloalkyl, or an acidic moiety. In some embodiments, each $R^M$ is independently bromo, chloro, cyano, —C(=O)NH$_2$, —C(=O)OH, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, or substituted 3-10 membered heterocycloalkyl.

In some embodiments, $Z_1$ is O (oxygen). In some embodiments, $Z_3$ is O (oxygen). In some embodiments, $Z_5$ is O (oxygen). In some embodiments, $Z_7$ is O (oxygen). In some embodiments, $Y_1$ is hydrogen. In some embodiments, $Y_3$ is hydrogen. In some embodiments, $Y_5$ is hydrogen. In some embodiments, $Y_7$ is hydrogen. In some embodiments, $Y_2$ is bromo. In some embodiments, $Y_4$ is bromo. In some embodiments, $Y_6$ is bromo. In some embodiments, $Y_8$ is bromo. In some embodiments, $Y_2$ is not bromo. In some embodiments, $Y_4$ is not bromo. In some embodiments, $Y_6$ is not bromo. In some embodiments, $Y_8$ is not bromo.

Some embodiments provide a compound having the structure:

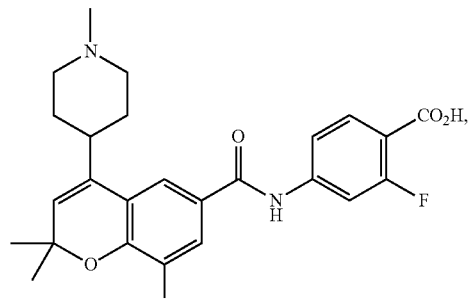

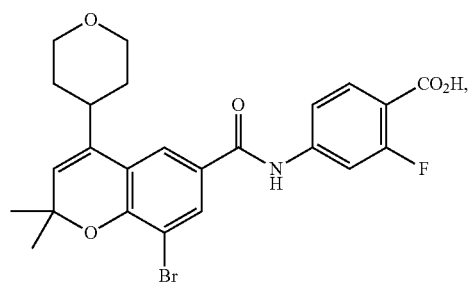

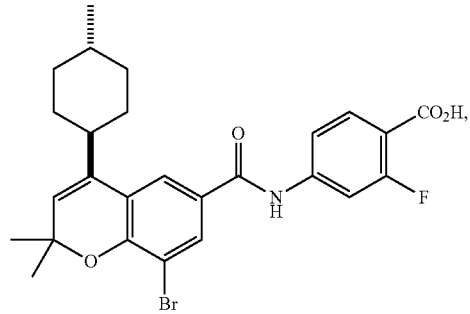

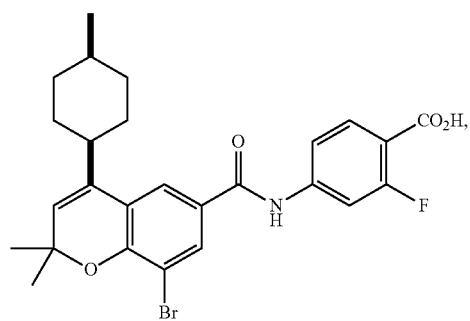

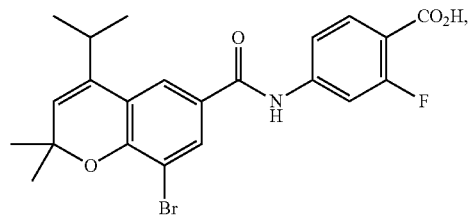

-continued

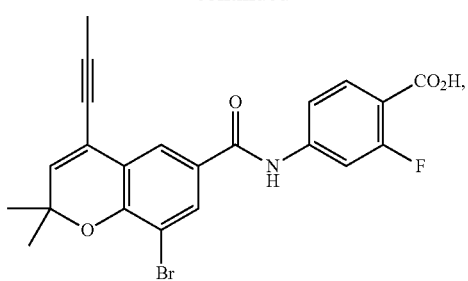

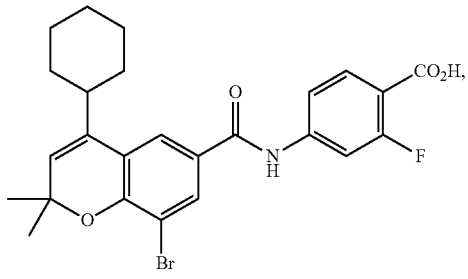

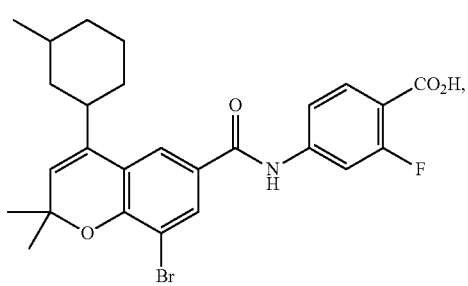

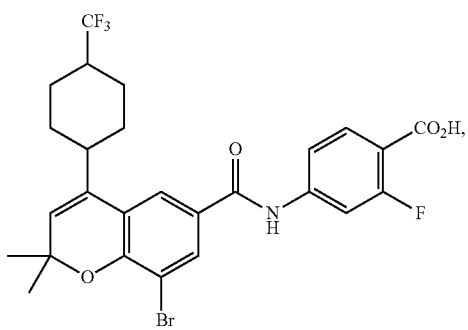

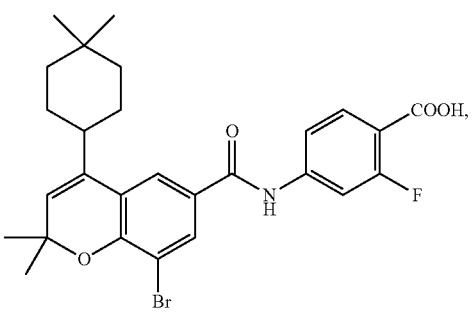

-continued

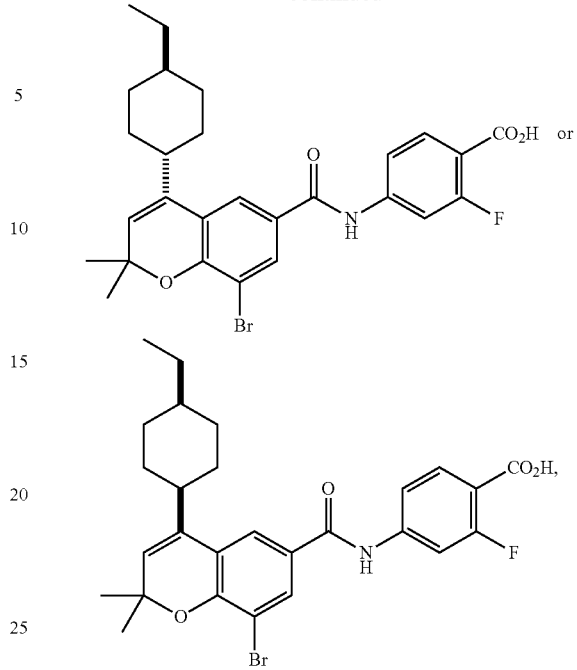

or a pharmaceutically acceptable salt, ester or tautomer thereof.

Some embodiments provide a pharmaceutical composition comprising a compound as disclosed and described herein. In some embodiments, the composition further comprises a pharmaceutically acceptable carrier.

Some embodiments provide a method of treating or preventing a condition in a subject, said condition associated with retinoic acid receptor activity, comprising administering to the subject an effective amount of a compound or composition as disclosed and described herein, or pharmaceutically acceptable salt, ester or tautomer of a compound as disclosed and described herein.

Some embodiments provide a method of treating cancer in a subject, comprising administering to the subject an effective amount of a compound or composition as disclosed and described herein, or pharmaceutically acceptable salt, ester or tautomer of a compound as disclosed and described herein.

Some embodiments provide a method of treating inflammatory disease in a subject, comprising administering to the subject an effective amount of a compound or composition as disclosed and described herein, or pharmaceutically acceptable salt, ester or tautomer of a compound as disclosed and described herein.

Some embodiments provide use of a compound or composition as disclosed and described herein, or pharmaceutically acceptable salt, ester or tautomer of a compound as disclosed and described herein for the manufacture of a medicament useful for treating inflammatory disease in an animal. In some embodiments, the inflammatory disease is inflammatory bowel disease, Crohn's Disease, or Ulcerative Colitis.

Some embodiments provide a compound or composition as disclosed and described herein, or pharmaceutically acceptable salt, ester or tautomer of a compound as disclosed and described herein for modulating RARα.

Some embodiments provide an anti-inflammatory medicament comprising a compound or composition as disclosed and described herein, or pharmaceutically acceptable salt, ester or tautomer of a compound as disclosed and described herein.

Some embodiments provide an anti-cancer medicament comprising a compound or composition as disclosed and described herein, or pharmaceutically acceptable salt, ester or tautomer of a compound as disclosed and described herein.

Some embodiments provide a method for inhibiting the ability of a male mammal to conceive progeny, comprising: regularly administering to said male mammal an effective amount of a compound or composition as disclosed and described herein, or pharmaceutically acceptable salt, ester or tautomer of a compound as disclosed and described herein for a period of time effective to sufficiently reduce or eliminate spermatozoa in the semen of said male mammal.

Some embodiments provide a method of temporarily and reversibly blocking spermatogenesis in a subject, comprising administering to the subject an effective amount of a compound or composition as disclosed and described herein, or pharmaceutically acceptable salt, ester or tautomer of a compound as disclosed and described herein.

Some embodiments provide a male contraceptive comprising:
i) a compound or composition of a compound as disclosed and described herein, or pharmaceutically acceptable salt, ester or tautomer of a compound as disclosed and described herein, and
ii) a pharmaceutically acceptable excipient.

Some embodiments provide a use of a compound or composition as disclosed and described herein, or pharmaceutically acceptable salt, ester or tautomer of a compound as disclosed and described herein for the manufacture of a medicament useful for temporarily and reversibly blocking spermatogenesis in a subject.

Some embodiments provide a male contraceptive medicament comprising a compound or composition as disclosed and described herein, or pharmaceutically acceptable salt, ester or tautomer of a compound as disclosed and described herein for the manufacture of a medicament useful for temporarily and reversibly blocking spermatogenesis in a subject.

These and other embodiments are described in greater detail below.

DETAILED DESCRIPTION

Disclosed herein are new compounds which may act as RARα modulators, methods for their manufacture, and methods for their use, including for the treatment and/or prevention of diseases or disorders mediated by RARα signaling. In some embodiments, the compounds provided herein, or pharmaceutically acceptable salt, ester or tautomer of a compound as disclosed and described herein may be used for treating or preventing Crohn's disease, ulcerative colitis, and other disorders where uncontrolled inflammation causes damage to the lining of the intestine, such as Behcet's enterocolitis, immune checkpoint inhibitor enterocolitis and celiac disease. In some embodiments, the compounds provided herein may be used for treating or preventing primary sclerosing cholangitis, human immunodeficiency virus infection or graft-versus-host disease. In some embodiments, the compounds provided herein may be used for treating cancers.

In some embodiments, compounds as disclosed and described herein, or pharmaceutically acceptable salt, ester or tautomer of a compound as disclosed and described herein may act as RARα modulators useful in treating disorders that involve pathogenic activation of RARα signaling by endogenous atRA in humans and animals, but particularly in humans. Such disorders may include the inflammatory bowel disorders Crohn's disease and ulcerative colitis (Crockett, Porter, Martin, Sandler & Kappelman, 2010; Fransen et al., 2013; Paul et al., 2018; Sanders et al., 2014) and other disorders where uncontrolled inflammation causes damage to the lining of the intestine, such as Behcet's enterocolitis (Lopalco et al., 2017), immune checkpoint inhibitor enterocolitis (Diana, Mankongpaisarnrung, Atkins, Zeck & Charabaty, 2018; Hsieh, Ferman, Brown & Andrews, 2016; Navarini et al., 2017) and celiac disease (DePaolo et al., 2011).

In some embodiments, compounds as disclosed and described herein, or pharmaceutically acceptable salt, ester or tautomer of a compound as disclosed and described herein may be used to treat primary sclerosing cholangitis (Eksteen et al., 2009; Westerveld, Grajo, Beattie & Glover, 2017), human immunodeficiency virus infection (Arthos et al., 2018; Nawaz et al., 2018; Sivro et al., 2018) or graft-versus-host disease (Aoyama et al., 2013; Chen, Dodge, Komorowski & Drobyski, 2013; Dodge, Stephans, Lai, Drobyski & Chen, 2016), where pro-inflammatory lymphocyte trafficking in response to atRA-induced gut-homing receptor expression contributes to disease pathogenesis. In some embodiments, compounds as disclosed and described herein may be used in vitro to block α4β7 expression on T cells during activation.

In some embodiments, compounds as disclosed and described herein, or pharmaceutically acceptable salt, ester or tautomer of a compound as disclosed and described herein may be used to treat cancers where elevated atRA signaling through RARα promotes formation of anti-inflammatory pTregs, thereby suppressing anti-tumor immune response mechanisms (Galvin et al., 2013; Hong et al., 2015; Guo et al., 2012).

In some embodiments, compounds as disclosed and described herein, or pharmaceutically acceptable salt, ester or tautomer of a compound as disclosed and described herein may be used to block growth of certain tumors (Daponte et al., 2007; van der Leede et al., 1996) as endogenous atRA may enhance cancer growth through RARα.

In some embodiments, compounds as disclosed and described herein, or pharmaceutically acceptable salt, ester or tautomer of a compound as disclosed and described herein may be used to temporarily and reversibly block spermatogenesis, thereby functioning as a male contraceptive.

Some embodiments provide a method for inhibiting the ability of a male mammal to conceive progeny, comprising: regularly administering to said male mammal an effective amount of a compound or composition as disclosed and described herein, or pharmaceutically acceptable salt, ester or tautomer of a compound as disclosed and described herein for a period of time effective to sufficiently reduce or eliminate spermatozoa in the semen of said male mammal. In some embodiments, the compound is a compound disclosed in TABLE-4 or pharmaceutically acceptable salt, ester or tautomer of a compound as disclosed in TABLE-4.

Some embodiments provide a method of temporarily and reversibly blocking spermatogenesis in a subject, comprising administering to the subject an amount of a compound or composition as disclosed and described herein, or pharmaceutically acceptable salt, ester or tautomer of a compound as disclosed and described herein. In some embodiments, the compound is a compound disclosed in TABLE-4 or pharmaceutically acceptable salt, ester or tautomer of a compound as disclosed in TABLE-4.

Some embodiments provide a male contraceptive comprising:
i) a compound or composition as disclosed and described herein, or pharmaceutically acceptable salt, ester or tautomer of a compound as disclosed and described herein, and
ii) a pharmaceutically acceptable excipient. In some embodiments, the compound is a compound disclosed in TABLE-4 or pharmaceutically acceptable salt, ester or tautomer of a compound as disclosed in TABLE-4.

Some embodiments provide a use of a compound or composition as disclosed and described herein, or pharmaceutically acceptable salt, ester or tautomer of a compound as disclosed and described herein for the manufacture of a medicament useful for temporarily and reversibly blocking spermatogenesis in a subject. In some embodiments, the compound is a compound disclosed in TABLE-4 or pharmaceutically acceptable salt, ester or tautomer of a compound as disclosed in TABLE-4.

Some embodiments provide a male contraceptive medicament comprising a compound or composition as disclosed and described herein, or pharmaceutically acceptable salt, ester or tautomer of a compound as disclosed and described herein for the manufacture of a medicament useful for temporarily and reversibly blocking spermatogenesis in a subject. In some embodiments, the compound is a compound disclosed in TABLE-4 or pharmaceutically acceptable salt, ester or tautomer of a compound as disclosed in TABLE-4.

Compounds and Synthetic Methods

The compounds provided by the present disclosure may be made using the methods outlined below and further described in the Examples section. Those with skill in the art will readily understand that known variations of the conditions and processes described in the Examples can be used to synthesize the compounds of the present disclosure as guided by the teachings provided herein. Starting materials and equipment employed were either commercially available prepared by methods previously reported and readily duplicated by those skilled in the art. Such principles and techniques are taught, for example, in *March's Advanced Organic Chemistry: Reactions, Mechanisms, and Structure* (2007), which is incorporated by reference herein.

Where the compounds disclosed herein have at least one chiral center, they may exist as individual enantiomers and diastereomers or as mixtures of such isomers, including racemates. Separation of the individual isomers or selective synthesis of the individual isomers is accomplished by application of various methods which are well known to practitioners in the art. Unless otherwise indicated, all such isomers and mixtures thereof are included in the scope of the compounds disclosed herein. Furthermore, compounds disclosed herein may exist in one or more crystalline or amorphous forms. Unless otherwise indicated, all such forms are included in the scope of the compounds disclosed herein including any polymorphic forms. In addition, some of the compounds disclosed herein may form solvates with water (i.e., hydrates) or common organic solvents. Unless otherwise indicated, such solvates are included in the scope of the compounds disclosed herein.

The skilled artisan will recognize that some structures described herein may be resonance forms or tautomers of compounds that may be fairly represented by other chemical structures, even when kinetically; the artisan recognizes that such structures may only represent a very small portion of a sample of such compound(s). Such compounds are considered within the scope of the structures depicted, though such resonance forms or tautomers are not represented herein.

Isotopes may be present in the compounds described. Each chemical element as represented in a compound structure may include any isotope of said element. For example, in a compound structure a hydrogen atom may be explicitly disclosed or understood to be present in the compound. At any position of the compound that a hydrogen atom may be present, the hydrogen atom can be any isotope of hydrogen, including but not limited to hydrogen-1 (protium) and hydrogen-2 (deuterium). Thus, reference herein to a compound encompasses all potential isotopic forms unless the context clearly dictates otherwise.

Definitions

Unless defined otherwise, all technical and scientific terms used herein have the same meaning as is commonly understood by one of ordinary skill in the art to which this disclosure belongs. All patents, applications, published applications, and other publications are incorporated by reference in their entirety. In the event that there is a plurality of definitions for a term herein, those in this section prevail unless stated otherwise.

"Solvate" refers to the compound formed by the interaction of a solvent and a compound described herein or salt thereof. Suitable solvates are pharmaceutically acceptable solvates including hydrates.

The term "pharmaceutically acceptable salt" and "pharmaceutically acceptable ester" refer to salts and esters, respectively, that retain the biological effectiveness and properties of a compound and, which are not biologically or otherwise undesirable for use in a pharmaceutical. In many cases, the compounds disclosed herein are capable of forming acid and/or base salts by virtue of the presence of amino and/or carboxyl groups or groups similar thereto. Pharmaceutically acceptable acid addition salts can be formed with inorganic acids and organic acids. Inorganic acids from which salts can be derived include, for example, hydrochloric acid, hydrobromic acid, sulfuric acid, nitric acid, phosphoric acid, and the like. Organic acids from which salts can be derived include, for example, acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Pharmaceutically acceptable base addition salts can be formed with inorganic and organic bases. Inorganic bases from which salts can be derived include, for example, sodium, potassium, lithium, ammonium, calcium, magnesium, iron, zinc, copper, manganese, aluminum, and the like; particularly preferred are the ammonium, potassium, sodium, calcium and magnesium salts. Organic bases from which salts can be derived include, for example, primary, secondary, and tertiary amines, substituted amines including naturally occurring substituted amines, cyclic amines, basic ion exchange resins, and the like, specifically such as isopropylamine, trimethylamine, diethylamine, triethylamine, tripropylamine, and ethanolamine. Many such salts are known in the art, as described in WO 87/05297, Johnston et al., published Sep. 11, 1987 (incorporated by reference herein in its entirety).

As used herein, "$C_a$ to $C_b$" or "$C_{a-b}$" in which "a" and "b" are integers refer to the number of carbon atoms in the specified group. That is, the group can contain from "a" to "b", inclusive, carbon atoms. Thus, for example, a "$C_1$ to $C_4$alkyl" or "$C_{1-4}$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—.

The term "halogen" or "halo," as used herein, means any one of the radio-stable atoms of column 7 of the Periodic Table of the Elements, e.g., fluorine, chlorine, bromine, or iodine, with fluorine and chlorine being preferred.

As used herein, "alkyl" refers to a straight or branched hydrocarbon chain that is fully saturated (i.e., contains no double or triple bonds). The alkyl group may have 1 to 20 carbon atoms (whenever it appears herein, a numerical range such as "1 to 20" refers to each integer in the given range; e.g., "1 to 20 carbon atoms" means that the alkyl group may consist of 1 carbon atom, 2 carbon atoms, 3 carbon atoms, etc., up to and including 20 carbon atoms, although the present definition also covers the occurrence of the term "alkyl" where no numerical range is designated). The alkyl group may also be a medium size alkyl having 1 to 9 carbon atoms. The alkyl group could also be a lower alkyl having 1 to 4 carbon atoms. The alkyl group may be designated as "$C_{1-4}$alkyl" or similar designations. By way of example only, "$C_{1-4}$alkyl" indicates that there are one to four carbon atoms in the alkyl chain, i.e., the alkyl chain is selected from the group consisting of methyl, ethyl, propyl, iso-propyl, n-butyl, iso-butyl, sec-butyl, and t-butyl. Typical alkyl groups include, but are in no way limited to, methyl, ethyl, propyl, isopropyl, butyl, isobutyl, tertiary butyl, pentyl, hexyl, and the like.

As used herein, "alkoxy" refers to the formula —OR wherein R is an alkyl as is defined above, such as "$C_{1-9}$alkoxy", including but not limited to methoxy, ethoxy, n-propoxy, 1-methylethoxy (isopropoxy), n-butoxy, iso-butoxy, sec-butoxy, and tert-butoxy, and the like.

As used herein, "alkylthio" refers to the formula —SR wherein R is an alkyl as is defined above, such as "$C_{1-9}$alkylthio" and the like, including but not limited to methylmercapto, ethylmercapto, n-propylmercapto, 1-methylethylmercapto (isopropylmercapto), n-butylmercapto, iso-butylmercapto, sec-butylmercapto, tert-butylmercapto, and the like.

As used herein, "alkenyl" refers to a straight or branched hydrocarbon chain containing one or more double bonds. The alkenyl group may have 2 to 20 carbon atoms, although the present definition also covers the occurrence of the term "alkenyl" where no numerical range is designated. The alkenyl group may also be a medium size alkenyl having 2 to 9 carbon atoms. The alkenyl group could also be a lower alkenyl having 2 to 4 carbon atoms. The alkenyl group may be designated as "$C_{2-4}$alkenyl" or similar designations. By way of example only, "$C_{2-4}$alkenyl" indicates that there are two to four carbon atoms in the alkenyl chain, i.e., the alkenyl chain is selected from the group consisting of ethenyl, propen-1-yl, propen-2-yl, propen-3-yl, buten-1-yl, buten-2-yl, buten-3-yl, buten-4-yl, 1-methyl-propen-1-yl, 2-methyl-propen-1-yl, 1-ethyl-ethen-1-yl, 2-methyl-propen-3-yl, buta-1,3-dienyl, buta-1,2,-dienyl, and buta-1,2-dien-4-yl. Typical alkenyl groups include, but are in no way limited to, ethenyl, propenyl, butenyl, pentenyl, and hexenyl, and the like.

As used herein, "alkynyl" refers to a straight or branched hydrocarbon chain containing one or more triple bonds. The alkynyl group may have 2 to 20 carbon atoms, although the present definition also covers the occurrence of the term "alkynyl" where no numerical range is designated. The alkynyl group may also be a medium size alkynyl having 2 to 9 carbon atoms. The alkynyl group could also be a lower alkynyl having 2 to 4 carbon atoms. The alkynyl group may be designated as "$C_{2-4}$alkynyl" or similar designations. By way of example only, "$C_{2-4}$alkynyl" indicates that there are two to four carbon atoms in the alkynyl chain, i.e., the alkynyl chain is selected from the group consisting of ethynyl, propyn-1-yl, propyn-2-yl, butyn-1-yl, butyn-3-yl, butyn-4-yl, and 2-butynyl. Typical alkynyl groups include, but are in no way limited to, ethynyl, propynyl, butynyl, pentynyl, and hexynyl, and the like.

As used herein, "heteroalkyl" refers to a straight or branched hydrocarbon chain containing one or more heteroatoms, that is, an element other than carbon, including but not limited to, nitrogen, oxygen and sulfur, in the chain backbone. The heteroalkyl group may have 1 to 20 carbon atom, although the present definition also covers the occurrence of the term "heteroalkyl" where no numerical range is designated. The heteroalkyl group may also be a medium size heteroalkyl having 1 to 9 carbon atoms. The heteroalkyl group could also be a lower heteroalkyl having 1 to 4 carbon atoms. The heteroalkyl group may be designated as "$C_{1-4}$ heteroalkyl" or similar designations. The heteroalkyl group may contain one or more heteroatoms. By way of example only, "$C_{1-4}$ heteroalkyl" indicates that there are one to four carbon atoms in the heteroalkyl chain and additionally one or more heteroatoms in the backbone of the chain.

As used herein, "alkylene" means a branched, or straight chain fully saturated di-radical chemical group containing only carbon and hydrogen that is attached to the rest of the molecule via two points of attachment (i.e., an alkanediyl). The alkylene group may have 1 to 20 carbon atoms, although the present definition also covers the occurrence of the term alkylene where no numerical range is designated. The alkylene group may also be a medium size alkylene having 1 to 9 carbon atoms. The alkylene group could also be a lower alkylene having 1 to 4 carbon atoms. The alkylene group may be designated as "$C_{1-4}$alkylene" or similar designations. By way of example only, "$C_{1-4}$alkylene" indicates that there are one to four carbon atoms in the alkylene chain, i.e., the alkylene chain is selected from the group consisting of methylene, ethylene, ethan-1,1-diyl, propylene, propan-1,1-diyl, propan-2,2-diyl, 1-methyl-ethylene, butylene, butan-1,1-diyl, butan-2,2-diyl, 2-methyl-propan-1,1-diyl, 1-methyl-propylene, 2-methyl-propylene, 1,1-dimethyl-ethylene, 1,2-dimethyl-ethylene, and 1-ethyl-ethylene.

As used herein, "alkenylene" means a straight or branched chain di-radical chemical group containing only carbon and hydrogen and containing at least one carbon-carbon double bond that is attached to the rest of the molecule via two points of attachment. The alkenylene group may have 2 to 20 carbon atoms, although the present definition also covers the occurrence of the term alkenylene where no numerical range is designated. The alkenylene group may also be a medium size alkenylene having 2 to 9 carbon atoms. The alkenylene group could also be a lower alkenylene having 2 to 4 carbon atoms. The alkenylene group may be designated as "$C_{2-4}$alkenylene" or similar designations. By way of example only, "$C_{2-4}$alkenylene" indicates that there are two to four carbon atoms in the alkenylene chain, i.e., the alkenylene chain is selected from the group consisting of ethenylene, ethen-1,1-diyl, propenylene, propen-1,1-diyl, prop-2-en-1,1-diyl, 1-methyl-ethenylene, but-1-enylene, but-2-enylene, but-1,3-dienylene, buten-1,1-diyl, but-1,3-dien-1,1-diyl, but-2-en-1,1-diyl, but-3-en-1,1-diyl, 1-methyl-prop-2-en-1,1-diyl, 2-methyl-prop-2-en-1,1-diyl, 1-ethyl-ethenylene, 1,2-dimethyl-ethenylene, 1-methyl-propenylene, 2-methylpropenylene, 3-methyl-propenylene, 2-methyl-propen-1,1-diyl, and 2,2-dimethyl-ethers-1,1-diyl.

The term "aromatic" refers to a ring or ring system having a conjugated pi electron system and includes both carbocyclic aromatic (e.g., phenyl) and heterocyclic aromatic groups (e.g., pyridine). The term includes monocyclic or fused-ring polycyclic (i.e., rings which share adjacent pairs of atoms) groups provided that the entire ring system is aromatic.

As used herein, "aryl" refers to an aromatic ring or ring system (i.e., two or more fused rings that share two adjacent carbon atoms) containing only carbon in the ring backbone. When the aryl is a ring system, every ring in the system is aromatic. The aryl group may have 6 to 18 carbon atoms, although the present definition also covers the occurrence of the term "aryl" where no numerical range is designated. In some embodiments, the aryl group has 6 to 10 carbon atoms. The aryl group may be designated as "$C_{6-10}$ aryl," "$C_6$ or $C_{10}$ aryl," or similar designations. Examples of aryl groups include, but are not limited to, phenyl, naphthyl, azulenyl, and anthracenyl.

As used herein, "aryloxy" and "arylthio" refers to RO— and RS—, in which R is an aryl as is defined above, such as "$C_{6-10}$ aryloxy" or "$C_{6-10}$ arylthio" and the like, including but not limited to phenyloxy.

An "aralkyl" or "arylalkyl" is an aryl group connected, as a substituent, via an alkylene group, such as "$C_{7-14}$aralkyl" and the like, including but not limited to benzyl, 2-phenylethyl, 3-phenylpropyl, and naphthylalkyl. In some cases, the alkylene group is a lower alkylene group (i.e., a $C_{1-4}$alkylene group).

As used herein, "heteroaryl" refers to an aromatic ring or ring system (i.e., two or more fused rings that share two adjacent atoms) that contain(s) one or more heteroatoms, that is, an element other than carbon, including but not limited to, nitrogen, oxygen and sulfur, in the ring backbone. When the heteroaryl is a ring system, every ring in the system is aromatic. The heteroaryl group may have 5-18 ring members (i.e., the number of atoms making up the ring backbone, including carbon atoms and heteroatoms), although the present definition also covers the occurrence of the term "heteroaryl" where no numerical range is designated. In some embodiments, the heteroaryl group has 5 to 10 ring members or 5 to 7 ring members. The heteroaryl group may be designated as "5-7 membered heteroaryl," "5-10 membered heteroaryl," or similar designations. Examples of heteroaryl rings include, but are not limited to, furyl, thienyl, phthalazinyl, pyrrolyl, oxazolyl, thiazolyl, imidazolyl, pyrazolyl, isoxazolyl, isothiazolyl, triazolyl, thiadiazolyl, pyridinyl, pyridazinyl, pyrimidinyl, pyrazinyl, triazinyl, quinolinyl, isoquinlinyl, benzimidazolyl, benzoxazolyl, benzothiazolyl, indolyl, isoindolyl, and benzothienyl.

A "heteroaralkyl" or "heteroarylalkyl" is heteroaryl group connected, as a substituent, via an alkylene group. Examples include but are not limited to 2-thienylmethyl, 3-thienylmethyl, furylmethyl, thienylethyl, pyrrolylalkyl, pyridylalkyl, isoxazollylalkyl, and imidazolylalkyl. In some cases, the alkylene group is a lower alkylene group (i.e., a $C_{1-4}$alkylene group).

As used herein, "carbocyclyl" means a non-aromatic cyclic ring or ring system containing only carbon atoms in the ring system backbone. When the carbocyclyl is a ring system, two or more rings may be joined together in a fused, bridged or spiro-connected fashion. Carbocyclyls may have any degree of saturation provided that at least one ring in a ring system is not aromatic. Thus, carbocyclyls include cycloalkyls, cycloalkenyls, and cycloalkynyls. The carbocyclyl group may have 3 to 20 carbon atoms, although the present definition also covers the occurrence of the term "carbocyclyl" where no numerical range is designated. The carbocyclyl group may also be a medium size carbocyclyl having 3 to 10 carbon atoms. The carbocyclyl group could also be a carbocyclyl having 3 to 6 carbon atoms. The carbocyclyl group may be designated as "$C_{3-6}$ carbocyclyl" or similar designations. Examples of carbocyclyl rings include, but are not limited to, cyclopropyl, cyclobutyl, cyclopentyl, cyclohexyl, cyclohexenyl, 2,3-dihydro-indene, bicycle[2.2.2]octanyl, adamantyl, and spiro[4.4]nonanyl.

A "(carbocyclyl)alkyl" is a carbocyclyl group connected, as a substituent, via an alkylene group, such as "$C_{4-10}$(carbocyclyl)alkyl" and the like, including but not limited to, cyclopropylmethyl, cyclobutylmethyl, cyclopropylethyl, cyclopropylbutyl, cyclobutylethyl, cyclopropylisopropyl, cyclopentylmethyl, cyclopentylethyl, cyclohexylmethyl, cyclohexylethyl, cycloheptylmethyl, and the like. In some cases, the alkylene group is a lower alkylene group.

As used herein, "cycloalkyl" means a fully saturated carbocyclyl ring or ring system. Examples include cyclopropyl, cyclobutyl, cyclopentyl, and cyclohexyl.

As used herein, "cycloalkenyl" means a carbocyclyl ring or ring system having at least one double bond, wherein no ring in the ring system is aromatic. An example is cyclohexenyl.

As used herein, "heterocyclyl" means a non-aromatic cyclic ring or ring system containing at least one heteroatom in the ring backbone. Heterocyclyls may be joined together in a fused, bridged or spiro-connected fashion. Heterocyclyls may have any degree of saturation provided that at least one ring in the ring system is not aromatic. The heteroatom(s) may be present in either a non-aromatic or aromatic ring in the ring system. The heterocyclyl group may have 3 to 20 ring members (i.e., the number of atoms making up the ring backbone, including carbon atoms and heteroatoms), although the present definition also covers the occurrence of the term "heterocyclyl" where no numerical range is designated. The heterocyclyl group may also be a medium size heterocyclyl having 3 to 10 ring members. The heterocyclyl group could also be a heterocyclyl having 3 to 6 ring members. The heterocyclyl group may be designated as "3-6 membered heterocyclyl" or similar designations. In preferred six membered monocyclic heterocyclyls, the heteroatom(s) are selected from one up to three of O, N or S, and in preferred five membered monocyclic heterocyclyls, the heteroatom(s) are selected from one or two heteroatoms selected from O, N, or S. Examples of heterocyclyl rings include, but are not limited to, azepinyl, acridinyl, carbazolyl, cinnolinyl, dioxolanyl, imidazolinyl, imidazolidinyl, morpholinyl, oxiranyl, oxepanyl, thiepanyl, piperidinyl, piperazinyl, dioxopiperazinyl, pyrrolidinyl, pyrrolidonyl, pyrrolidionyl, 4-piperidonyl, pyrazolinyl, pyrazolidinyl, 1,3-dioxinyl, 1,3-dioxanyl, 1,4-dioxinyl, 1,4-dioxanyl, 1,3-oxathianyl, 1,4-oxathiinyl, 1,4-oxathianyl, 2H-1,2-oxazinyl, trioxanyl, hexahydro-1,3,5-triazinyl, 1,3-dioxolyl, 1,3-dioxolanyl, 1,3-dithiolyl, 1,3-dithiolanyl, isoxazolinyl, isoxazolidinyl, oxazolinyl, oxazolidinyl, oxazolidinonyl, thiazolinyl, thiazolidinyl, 1,3-oxathiolanyl, indolinyl, isoindolinyl, tetrahydrofuranyl, tetrahydropyranyl, tetrahydrothiophenyl, tetrahydrothiopyranyl, tetrahydro-1,4-thiazinyl, thiamorpholinyl, dihydrobenzofuranyl, benzimidazolidinyl, and tetrahydroquinoline.

A "(heterocyclyl)alkyl" is a heterocyclyl group connected, as a substituent, via an alkylene group. Examples include, but are not limited to, imidazolinylmethyl and indolinylethyl.

As used herein, "acyl" refers to —C(=O)R, wherein R is hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein. Non-limiting examples include formyl, acetyl, propanoyl, benzoyl, and acryl.

An "O-carboxy" group refers to a "—OC(=O)R" group in which R is selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

A "C-carboxy" group refers to a "—C(=O)OR" group in which R is selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein. A non-limiting example includes carboxyl (i.e., —C(=O)OH).

An "ester" group refers to a "—C(=O)OR" group in which R is selected from $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein. A non-limiting example includes methyl ester (i.e., —C(=O)CH$_3$).

A "cyano" group refers to a "—CN" group.

A "cyanato" group refers to an "—OCN" group.

An "isocyanato" group refers to a "—NCO" group.

A "thiocyanato" group refers to a "—SCN" group.

An "isothiocyanato" group refers to an "—NCS" group.

A "sulfinyl" group refers to an "—S(=O)R" group in which R is selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

A "sulfonyl" group refers to an "—SO$_2$R" group in which R is selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "S-sulfonamido" group refers to a "—SO$_2$NR$_A$R$_B$" group in which R$_A$ and R$_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "N-sulfonamido" group refers to a "—N(R$_A$)SO$_2$R$_B$" group in which R$_A$ and R$_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "O-carbamyl" group refers to a "—OC(=O)NR$_A$R$_B$" group in which R$_A$ and R$_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "N-carbamyl" group refers to an "—N(R$_A$)C(=O)OR$_B$" group in which R$_A$ and R$_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "O-thiocarbamyl" group refers to a "—OC(=S)NR$_A$R$_B$" group in which R$_A$ and R$_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "N-thiocarbamyl" group refers to an "—N(R$_A$)C(=S)OR$_B$" group in which R$_A$ and R$_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

A "C-amido" group refers to a "—C(=O)NR$_A$R$_B$" group in which R$^A$ and R$^B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "N-amido" group refers to a "—N(R$_A$)C(=O)R$_B$" group in which R$_A$ and R$_B$ are each independently selected from hydrogen, $C_{1-6}$ alkyl, $C_{1-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "amino" group refers to a "—NR$_A$R$_B$" group in which R$_A$ and R$_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein. A non-limiting example includes free amino (i.e., —NH$_2$).

An "aminoalkyl" group refers to an amino group connected via an alkylene group.

An "alkoxyalkyl" group refers to an alkoxy group connected via an alkylene group, such as a "$C_{2-8}$ alkoxyalkyl" and the like.

As used herein, a substituted group is derived from the unsubstituted parent group in which there has been an exchange of one or more hydrogen atoms for another atom or group. Unless otherwise indicated, when a group is deemed to be "substituted," it is meant that the group is substituted with one or more substituents independently selected from $C_1$-$C_6$ alkyl, $C_1$-$C_6$ alkenyl, $C_1$-$C_6$ alkynyl, $C_1$-$C_6$ heteroalkyl, $C_3$-$C_7$ carbocyclyl (optionally substituted with halo, $C_1$-$C_6$ alkyl, $C_1$-$C_6$ alkoxy, $C_1$-$C_6$ haloalkyl, and $C_1$-$C_6$ haloalkoxy), $C_3$-$C_7$-carbocyclyl-$C_1$-$C_6$-alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heterocyclyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heterocyclyl-$C_1$-$C_6$-alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), aryl (optionally substituted with halo, $C_1$-$C_6$ alkyl, $C_1$-$C_6$ alkoxy, $C_1$-$C_6$ haloalkyl, and $C_1$-$C_6$ haloalkoxy), aryl($C_1$-$C_6$)alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heteroaryl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heteroaryl($C_1$-$C_6$) alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), halo, cyano, hydroxy, $C_1$-$C_6$ alkoxy, $C_1$-$C_6$ alkoxy($C_1$-$C_6$)alkyl (i.e., ether), aryloxy, sulfhydryl (mercapto), halo($C_1$-$C_6$) alkyl (e.g., —CF$_3$), halo($C_1$-$C_6$)alkoxy (e.g., —OCF$_3$), $C_1$-$C_6$ alkylthio, arylthio, amino, amino($C_1$-$C_6$)alkyl, nitro, 0-carbamyl, N-carbamyl, 0-thiocarbamyl, N-thiocarbamyl, C-amido, N-amido, S-sulfonamido, N-sulfonamido, C-carboxy, O-carboxy, acyl, cyanato, isocyanato, thiocyanato, isothiocyanato, sulfinyl, sulfonyl, and oxo (=O). Wherever a group is described as "optionally substituted" that group can be substituted with the above substituents.

It is to be understood that certain radical naming conventions can include either a mono-radical or a di-radical, depending on the context. For example, where a substituent requires two points of attachment to the rest of the molecule, it is understood that the substituent is a di-radical. For example, a substituent identified as alkyl that requires two points of attachment includes di-radicals such as —CH$_2$—, —CH$_2$CH$_2$—, —CH$_2$CH(CH$_3$)CH$_2$—, and the like. Other radical naming conventions clearly indicate that the radical is a di-radical such as "alkylene" or "alkenylene."

When two R groups are said to form a ring (e.g., a carbocyclyl, heterocyclyl, aryl, or heteroaryl ring) "together with the atom to which they are attached," it is meant that the collective unit of the atom and the two R groups are the recited ring. The ring is not otherwise limited by the definition of each R group when taken individually. For example, when the following substructure is present:

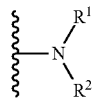

and R¹ and R² are defined as selected from the group consisting of hydrogen and alkyl, or R¹ and R² together with the nitrogen to which they are attached form a heteroaryl, it is meant that R¹ and R² can be selected from hydrogen or alkyl, or alternatively, the substructure has structure:

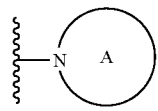

where ring A is a heteroaryl ring containing the depicted nitrogen.

Similarly, when two "adjacent" R groups are said to form a ring "together with the atoms to which they are attached," it is meant that the collective unit of the atoms, intervening bonds, and the two R groups are the recited ring. For example, when the following substructure is present:

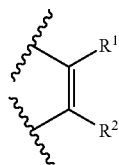

and R¹ and R² are defined as selected from the group consisting of hydrogen and alkyl, or R¹ and R² together with the atoms to which they are attached form an aryl or carbocyclyl, it is meant that R¹ and R² can be selected from hydrogen or alkyl, or alternatively, the substructure has structure:

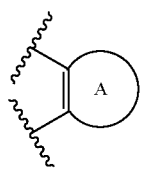

where A is an aryl ring or a carbocyclyl containing the depicted double bond.

Wherever a substituent is depicted as a di-radical (i.e., has two points of attachment to the rest of the molecule), it is to be understood that the substituent can be attached in any directional configuration unless otherwise indicated. Thus, for example, a substituent depicted as -AE- or

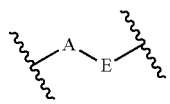

includes the substituent being oriented such that the A is attached at the leftmost attachment point of the molecule as well as the case in which A is attached at the rightmost attachment point of the molecule.

As used herein, "acidic moiety" is a group that exhibits similar properties of a carboxylic acid. In some embodiments, the acidic moiety is a tetrazole. In some embodiments, the acidic moiety may be —SO₃H, —SO₂HNR, —PO₂(R)₂, —PO₃(R)₂, —CONHNHSO₂R, —COHNSO₂R, and —CONRCN, where R is selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein. In some embodiments, the acidic moiety is selected from:

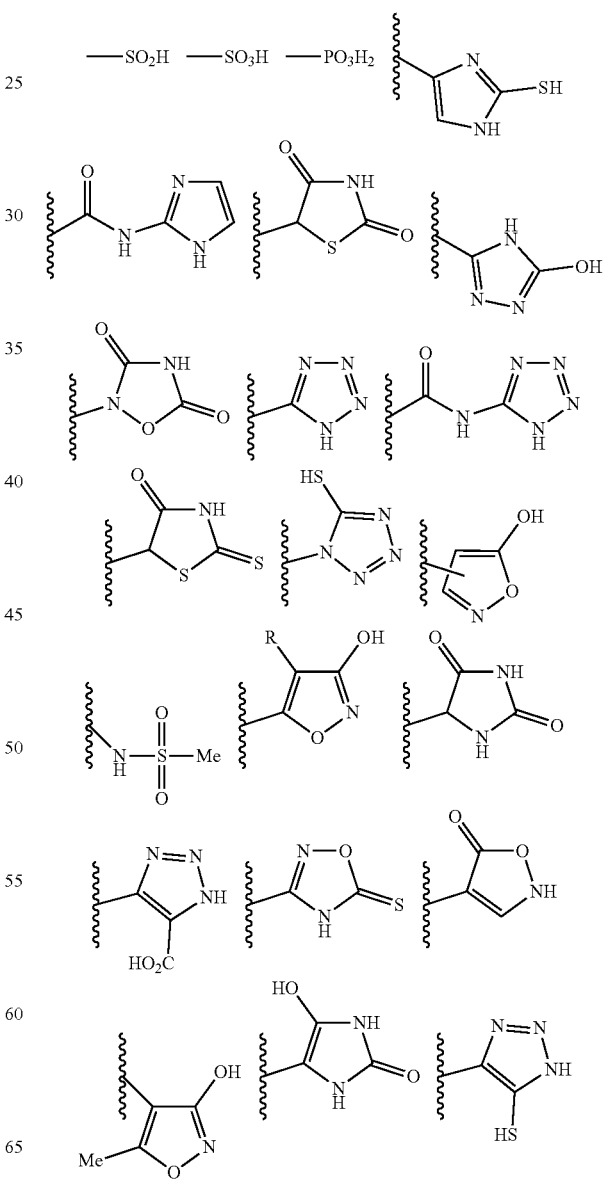

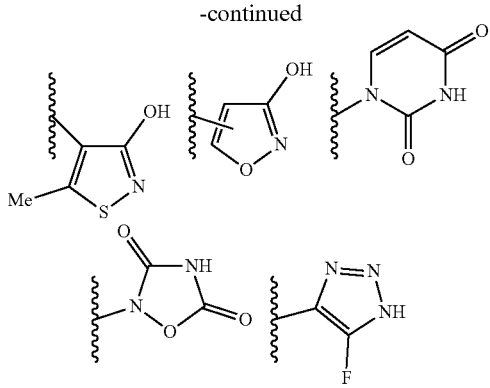

"Subject" as used herein, means a human or a non-human mammal, e.g., a dog, a cat, a mouse, a rat, a cow, a sheep, a pig, a goat, a non-human primate or a bird, e.g., a chicken, as well as any other vertebrate or invertebrate.

The term "mammal" is used in its usual biological sense. Thus, it specifically includes, but is not limited to, primates, including simians (chimpanzees, apes, monkeys) and humans, cattle, horses, sheep, goats, swine, rabbits, dogs, cats, rodents, rats, mice guinea pigs, or the like.

An "effective amount" or a "therapeutically effective amount" as used herein refers to an amount of a therapeutic agent that is effective to relieve, to some extent, or to reduce the likelihood of onset of, one or more of the symptoms of a disease or condition, and includes curing a disease or condition. "Curing" means that the symptoms of a disease or condition are eliminated; however, certain long-term or permanent effects may exist even after a cure is obtained (such as extensive tissue damage).

"Treat," "treatment," or "treating," as used herein refers to administering a compound or pharmaceutical composition to a subject for prophylactic and/or therapeutic purposes. The term "prophylactic treatment" refers to treating a subject who does not yet exhibit symptoms of a disease or condition, but who is susceptible to, or otherwise at risk of, a particular disease or condition, whereby the treatment reduces the likelihood that the patient will develop the disease or condition. The term "therapeutic treatment" refers to administering treatment to a subject already suffering from a disease or condition.

To "modulate" or "modulating" means to affect the transcriptional activity of a receptor, for example a nuclear receptor such as RARα (for which alternative nomenclature includes RAR-alpha or NR1B1). Assays for transcription of RARα have been implemented (Thacher, Crowe, Tao and Raheja, 2017 or WO 2017/201200 A1, Therapeutic compositions containing RAR-alpha antagonists). Among modulators of the RARs are antagonists, which attenuate the stimulatory effect of retinoic acid (or another RAR agonist molecule). Some antagonists are also referred to as "inverse agonists", based on suppression of basal receptor activity, and these can have distinct pharmacological properties when compared to "neutral antagonists" (Klein, Pino et al, 1996; Thacher, Nagpal et al, 1999). RARα antagonist refers herein to RARα modulators that inhibit the stimulatory effect of an agonist by 90% or more and includes inverse agonists and most neutral antagonists.

Synthesis of Ethyl 8-bromo-2,2-dimethyl-4-oxochroman-6-carboxylate (7)

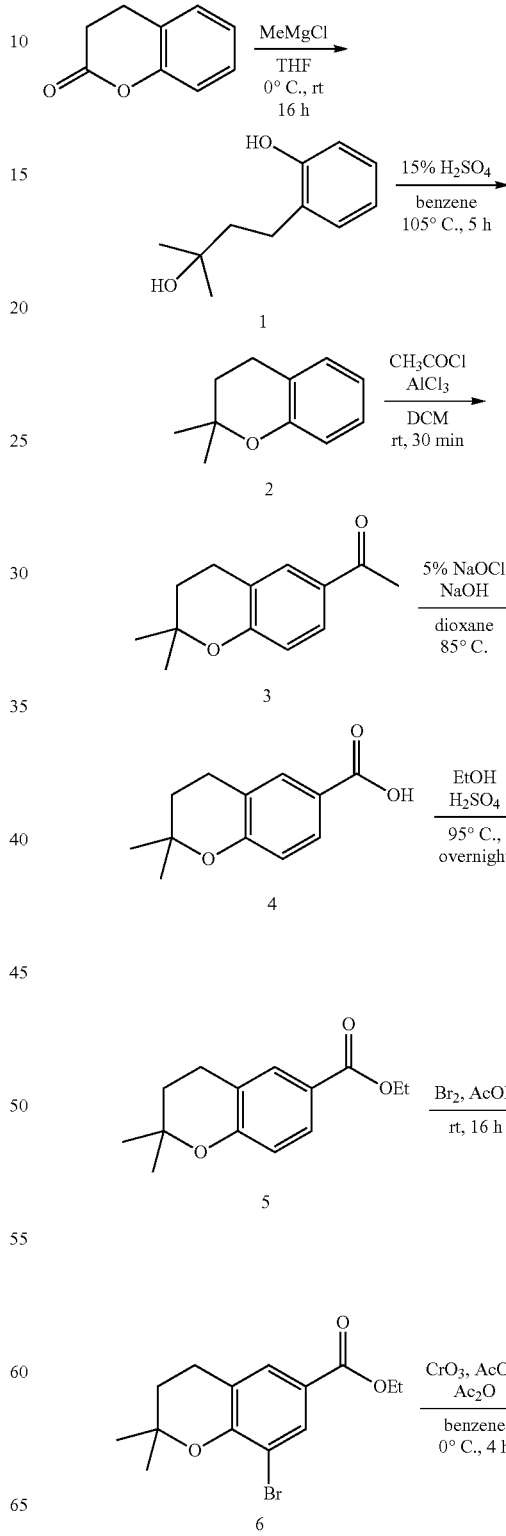

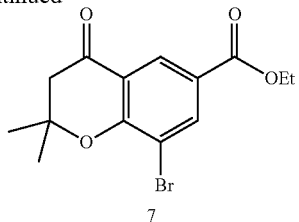

7

Synthesis of 2-(3-Hydroxy-3-methylbutyl)phenol (1)

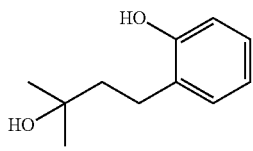

To a solution of chroman-2-one (300 g, 2.027 mol) in dry THF (500 mL) at 0° C. was added methylmagnesium chloride (2.0 M, 2.3 L solution in THF, and 4.662 mol) drop-wise. The reaction mixture was slowly warmed to room temperature and stirred at room temperature for overnight. The reaction was quenched with water (2 L) and extracted with diethyl ether (2×2 L). The combined organic layers were dried over $Na_2SO_4$, concentrated under reduced pressure to afford 2-(3-hydroxy-3-methylbutyl)phenol (1) (290 g, 94%) as a pale yellow solid.

Synthesis of 2,2-Dimethylchroman (2)

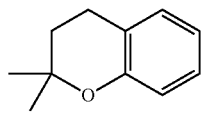

To a stirred solution of 2-(3-hydroxy-3-methylbutyl)phenol (1) (290 g, 1.611 mol) in benzene (1.0 L) was added 15% aqueous $H_2SO_4$ (2.5 L) at rt. The reaction mixture was heated to 105° C. and stirred for 5 h. The reaction mixture was cooled and extracted with diethyl ether (2×2 L). The combined ether layer was dried ($Na_2SO_4$), and concentrated under reduced pressure to afford 2,2-dimethylchroman (2) (265 g) as a light yellow liquid.

Synthesis of 1-(2,2-Dimethylchroman-6-yl)ethanone (3)

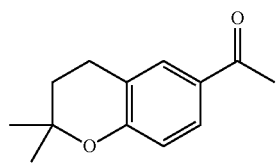

To a solution of 2,2-dimethylchroman (2) (125 g, 0.771 mol) in dry $CH_2Cl_2$ (3 L) was drop-wise added acetyl chloride (60.5 ml, 848.76 mmol), prior to the portion-wise addition of $AlCl_3$ (113 g, 0.848 mol). The reaction mixture was stirred at room temperature for 30 min and then poured into ice-water and extracted with $CH_2Cl_2$ (2×2 L); the combined organic layer was dried over anhydrous $Na_2SO_4$ and concentrated under reduced pressure. The crude compound was purified by column chromatography (silica gel; eluent ethyl acetate:hexanes, 1:9) to afford 1-(2,2-dimethylchroman-6-yl)ethanone (3) (90 g, 57%) as a pale yellow solid.

Synthesis of 2,2-Dimethylchroman-6-carboxylic acid (4)

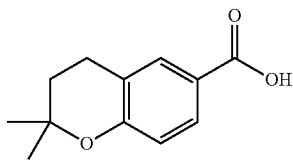

To a solution of 2,2-dimethylchroman-6-yl)ethanone (3) (90 g, 0.441 mol) and NaOH (83 g, 2.073 mmol) in dioxane (1.5 L) was added a solution of bleach (1.5 L, 5.25% NaOCl). The reaction mixture was heated to 65° C. and stirred for 16 h. Upon cooling to room temperature, $Na_2SO_3$ (200 g) was added. The reaction mixture was acidified with $H_2SO_4$ (pH~4) and extracted with ethyl acetate (2×1.5 L). The combined organic layer was dried ($Na_2SO_4$) and concentrated under reduced pressure. The crude compound was purified by column chromatography (silica gel; ethyl acetate:hexanes, 1:3) to afford 2,2-dimethylchroman-6-carboxylic acid (4) (80 g, 88%) as a pale yellow solid.

Synthesis of Ethyl 2,2-dimethylchroman-6-carboxylate (5)

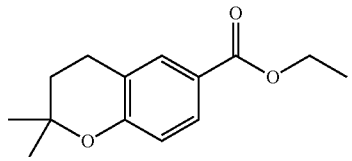 [SMILES: CCOC(=O)c1ccc2c(c1)CCC(C)(C)O2]

To a stirred solution of 2,2-dimethylchroman-6-carboxylic acid (4) (80 g, 0.388 mol) in ethanol (1.6 L) was added $H_2SO_4$ (22 mL) drop-wise. The reaction mixture was heated to 95° C. and stirred for 24 h. Ethanol was removed under reduced pressure; resulting crude compound was purified by column chromatography (silica gel; eluent-ethyl acetate: hexanes 1:5) to afford ethyl 2,2-dimethylchroman-6-carboxylate (5) (65 g, 71%) as a pale yellow solid.

Synthesis of Ethyl
8-bromo-2,2-dimethylchroman-6-carboxylate (6)

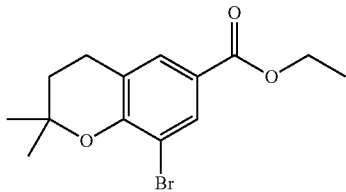 [SMILES: CCOC(=O)c1cc(Br)c2c(c1)CCC(C)(C)O2]

To a solution of ethyl 2,2-dimethylchroman-6-carboxylate (5) (60 g, 0.256 mol) in AcOH (500 mL) was added bromine (13.15 mL, 0.256 mmol) and the resulting reaction mixture was stirred at room temperature for overnight. The reaction mixture was concentrated under reduced pressure. The crude compound was purified by column chromatography (silica gel; eluent-ethyl acetate:hexanes, 1:9) to afford ethyl 8-bromo-2,2-dimethylchroman-6-carboxylate (6) (60 g, 74%) as a pale brown color oil. Synthesis of Ethyl 8-bromo-2,2-dimethyl-4-oxochroman-6-carboxylate (7)

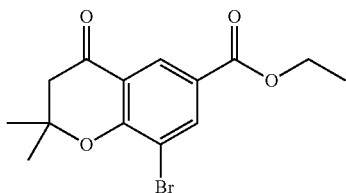 [SMILES: CCOC(=O)c1cc(Br)c2c(c1)C(=O)CC(C)(C)O2]

To a solution of AcOH (800 ml) and Ac$_2$O (285 mL) at 0° C. was added CrO$_3$ (47.9 g, 479.23 mmol) in small portions. This solution was stirred for 15 min and diluted with benzene (100 mL), prior to the addition of ethyl 8-bromo-2,2-dimethylchroman-6-carboxylate (6) (30 g, 95.85 mmol) in benzene (150 mL) over 0.5 h. After 4 h of stirring at 0° C., the reaction mixture was poured over ice and extracted with ethyl acetate (2×500 mL). The combined organic layer was dried (Na$_2$SO$_4$) and concentrated under reduced pressure. The crude compound was purified by column chromatography (silica gel; eluent-ethyl acetate:hexanes, 1:9) to afford ethyl 8-bromo-2,2-dimethyl-4-oxochroman-6-carboxylate (7) (18 g, 57%) as an off-white solid.

Scheme 2

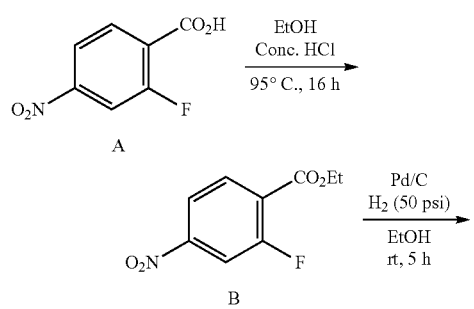

Synthesis of Ethyl 2-fluoro-4-nitrobenzoate (B)

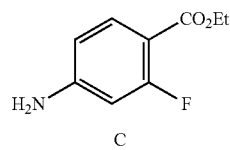

To a stirred solution of ethyl 2-fluoro-4-nitrobenzoic acid (A) (73 g, 394.59 mmol) in ethanol (600 mL) was added conc. HCl (10 mL). The reaction mixture was heated to 95° C. and stirred for 16 h. Ethanol was removed under reduced pressure, crude compound was triturated with pet ether (250 mL), filtered and the residue was dried under reduced pressure to afford ethyl 2-fluoro-4-nitrobenzoate (B) (63 g, 75%) as a pale yellow solid.

Synthesis of Ethyl 4-amino-2-fluorobenzoate (C)

To a solution of ethyl 2-fluoro-4-nitrobenzoate (B) (63 g, 295.77 mmol) in ethanol (1 L) was added 10% palladium on carbon (12.6 g) in a hydrogenation flask and stirred in a Parr shaker for 5 h under hydrogen (60 psi). The reaction mixture was filtered through celite, filtrate was concentrated under reduced pressure to afford ethyl 4-amino-2-fluorobenzoate (C) (55 g, 100%) as an off-white solid.

Scheme 3

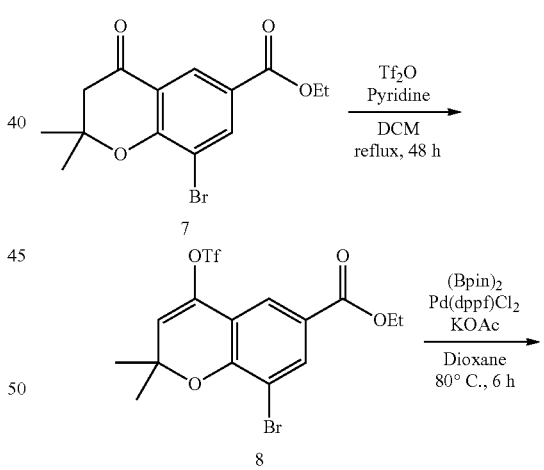

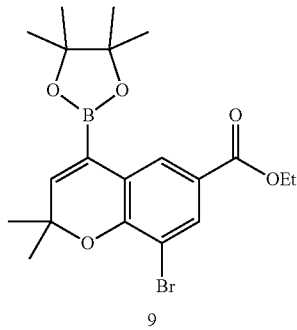

Synthesis of Ethyl 8-bromo-2,2-dimethyl-4-(trifluoromethylsulfonyloxy)-2H-chromene-6-carboxylate (8)

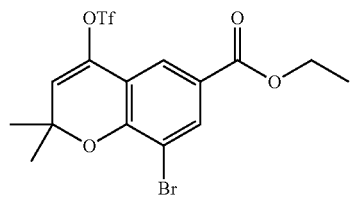 [SMILES: CCOC(=O)c1cc(Br)c2c(c1)C(OS(=O)(=O)C(F)(F)F)=CC(C)(C)O2]

To a stirred solution of ethyl 8-bromo-2,2-dimethyl-4-oxochroman-6-carboxylate (7) (2 g, 6.097 mmol) in $CH_2Cl_2$ (50 mL) were added pyridine (0.75 mL, 9.146 mmol) and trifluoroacetic anhydride (2.58 mL, 7.317 mmol) at 0° C. for 10 min. The resulting reaction mixture was maintained for 20 h at 50° C. under argon atmosphere. The reaction mixture was cooled, diluted with $CH_2Cl_2$ (100 mL) and water (50 mL). The separated organic layer was washed with water, brine, dried over anhydrous sodium sulphate and concentrated in vacuum to afford ethyl 8-bromo-2,2-dimethyl-4-(trifluoromethylsulfonyloxy)-2H-chromene-6-carboxylate (8) (2 g; crude) as a brown color semi solid. This compound was used immediately for the next step reaction.

Synthesis of Ethyl 8-bromo-2,2-dimethyl-4-(4,4,5,5-tetramethyl-1,3,2-dioxaborolan-2-yl)-2H-chromene-6-carboxylate (9)

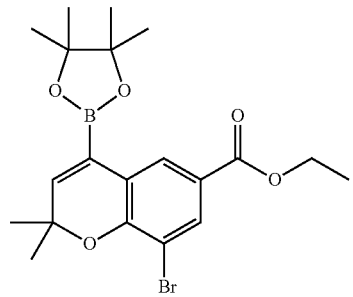 [SMILES: CCOC(=O)c1cc(Br)c2c(c1)C(B1OC(C)(C)C(C)(C)O1)=CC(C)(C)O2]

To a stirred solution of ethyl 8-bromo-2,2-dimethyl-4-(trifluoromethylsulfonyloxy)-2H-chromene-6-carboxylate (8) (1.5 g, 3.275 mmol) in 1,4-dioxane (20 mL) were added bis-pincolato diboron (1.08 g, 4.257 mmol), potassium acetate (1.285 g, 13.100 mmol) and the resulting mixture was de-gassed with argon for 10 min. Then, Pd(dppf) $Cl_2 \cdot CH_2Cl_2$ (239 mg, 0.327 mmol) was added and the resulting reaction mixture was stirred at 90° C. for 2 h. The reaction mixture was brought to ambient temperature, diluted with ethyl acetate and filtered. The filtrate was concentrated in vacuum, and the resulting crude compound was purified by column chromatography (silica gel #100-200) with a gradient mixture of 10% ethyl acetate in pet-ether as eluent to afford ethyl 8-bromo-2,2-dimethyl-4-(4,4,5,5-tetramethyl-1,3,2-dioxaborolan-2-yl)-2H-chromene-6-carboxylate (9) (1.2 g; 42%) of as an off white solid. This compound was used as such for the next step reaction.

Scheme 4

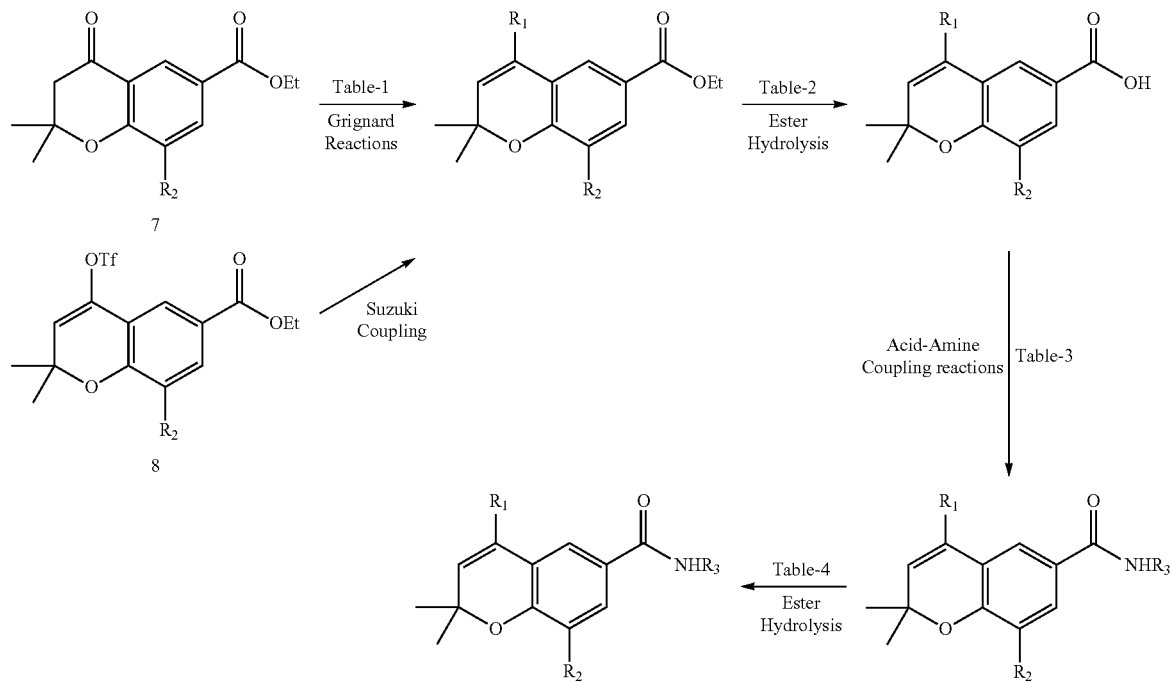

General Procedures for the Synthesis of Compounds of Table 1:

Methods for the Preparation of R1-MgX (Grignard Reagent):

Method-1: To magnesium turnings (activated; 1.5 eq) taken in a flame dried flask, were added THF and 1,2-dibromoethane/$I_2$ (cat), and the resulting mixture was heated to 60-65° C. and the corresponding R—X (solution in THF) was added to it slowly. The resulting reaction mixture was stirred at 60-65° C. for another 1.5 h.

Method-2: iPrMgCl (1M in THF; 1 eq) and LiCl (2.5 eq) were added to a solution of corresponding R—X (1 eq) in THF at 0° C. and the resulting solution was stirred at this temperature for 2 h. This solution was used as such for the Grignard Reaction.

Grignard Reaction:

Method-3: (Table-1) (1 eq) was dissolved in THF and the cooled the solution to −78° C. Grignard reagent (3 eq) was added drop wise to this reaction solution. The resulting reaction mixture was stirred for 6-16 h while allowing the reaction mixture to attain room temperature. Completion of the reaction was monitored by TLC. The reaction mixture was quenched with Aq. $NH_4Cl$ and extracted with ethyl acetate. Combined organic layer was washed with water, brine, dried ($Na_2SO_4$) filtered and concentrated under reduced pressure. The crude residue was dissolved in toluene, treated with p-TsOH (0.1 eq) at 110° C. for 2-16 h (monitored by TLC). Solvent was removed and the residue was purified by flash chromatography.

Methods of Purification (Tables 1-4):

Method-A: Crude compound was purified by flash/column chromatography on silica gel, using EtOAc-Pet ether as eluent.

Method-B: Crude compound was triturated with pentane/diethyl ether (2 x), filtered and dried under high vacuum.

Method-C: Crude compound was purified by Reverse phase Prep-HPLC.

Method-D: Crude compound was purified by flash/column chromatography on silica gel, using MeOH—$CH_2Cl_2$ as eluent.

TABLE-1

| Product Esters | Precursor amount | Reagent | Reaction Method/ Purification | Analytical Data m/z [M + H]$^+$ |
|---|---|---|---|---|
| 10 490 mg (26% Yield) | 1.5 g (4.6 mmol) | MgCl / Method-1 | Method-3/ Method-D | 408.0 |
| 11 300 mg (14% Yield) | 2.0 g (6.1 mmol) | MgCl 1M in THF (3.0 eq) | Method-3/ Method-A | 353.0 |
| 12 600 mg (25% Yield) | 2.0 g (6.1 mmol) | MgCl / Method-1 | Method-3/ Method-A | 395.0 |

TABLE-1-continued

| Product Esters | Precursor amount | Reagent | Reaction Method/ Purification | Analytical Data m/z [M + H]+ |
|---|---|---|---|---|
| 13 800 mg (30% Yield) | 1.6 g (5.1 mmol) | 4-methylcyclohexyl-MgBr Method-1 | Method-3/ Method-A | 407.0 |
| 14 600 mg (28% Yield) | 2.0 g (6.1 mmol) | ethynyl-MgBr 0.5M in THF (1.5 eq) | Method-3/ Method-A | 348.9 |
| 15 1.65 g (57% Yield) | 2.26 g (6.95 mmol) | 4,4-dimethylcyclohexyl-MgBr | Method-3/ Method-A | 421.17 |
| 16 1.31 g (51% Yield) | 2.0 g (6.1 mmol) | 4-ethylcyclohexyl-MgBr Method-1 | Method-3/ Method-A | 420.1 |

General Procedure for Ester Hydrolysis (Table-2):

Method-4: To ethyl ester dissolved in a solvent mixture of EtOH-THF-H$_2$O (1:1:1) LiOH·H$_2$O (5 eq) was added and the resulting reaction mixture was stirred at 40-50° C. for 16 h (monitored by TLC). The solvent was removed under reduced pressure, the residue was diluted with water and washed with diethyl ether (1×). The aqueous layer was adjusted to pH~3-4 using 10% aqueous citric acid and the precipitated solids were collected by filtration and dried under high vacuum.

TABLE-2

| Product Acids | Qty of Ester (mmol) | Reaction Method/ Purification | Analytical Data m/z [M + H]$^+$ |
|---|---|---|---|
| 17<br>140 mg (30% Yield) | 10<br>490 mg<br>(1.20) | Method-4/<br>Method-C | 379.9 |
| 18<br>250 mg (90% Yield) | 11<br>300 mg<br>(0.852) | Method-4/<br>Method-A | 325.0 |
| 19<br>200 mg (43% Yield) | 12<br>500 mg<br>(1.260) | Method-4/<br>Method-B | 367.0 |
| 20<br>500 mg (50% Yield) | 13<br>800 mg<br>(1.97) | Method-4/<br>Method-B | 379.0 |

TABLE-2-continued

| Product Acids | Qty of Ester (mmol) | Reaction Method/ Purification | Analytical Data m/z [M + H]+ |
|---|---|---|---|
| 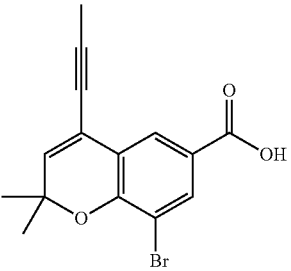<br>21<br>500 mg (90% Yield) | 14<br>600 mg<br>(1.72) | Method-4/<br>Method-B | 320.9 |
| 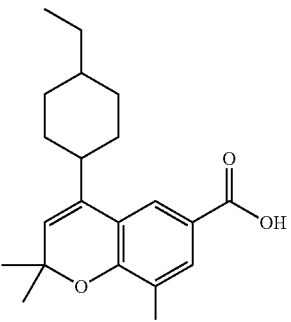<br>22<br>307 mg (55%) | 16<br>600 mg<br>(1.42) | Method-4/<br>Method-B | 392.1 |

General Procedure for the Synthesis of Amides (Table-3):

Method-5: To a solution of acid (1 eq.) dissolved in CH$_2$Cl$_2$ (5 volumes) was treated with oxalyl chloride (1 mL/200 mg), stirred at 50° C. for 16 h (monitored by TLC); the reaction solution was concentrated under reduced pressure to get the corresponding acid chloride.

The crude acid chloride was dissolved in CH$_2$Cl$_2$ (5 volumes), the solution was cooled to 0° C. and treated with pyridine (1 mL/200 mg) followed by the addition of amines (1.5 eq). The resulting reaction mixture was stirred at room temperature for 24 h (monitored by TLC). The reaction solution was concentrated under reduced pressure and the residue was diluted with CH$_2$Cl$_2$, washed with water, brine, dried (Na$_2$SO$_4$) filtered and concentrated under reduced pressure to afford crude compound, which upon purification by flash chromatography to afforded pure compound.

Method-6: To a stirred solution of ester (15) (1.6 g, 3.809 mmol) and ethyl-4-amino-2-fluorobenzoate (1.045 g, 5.714 mmol) in dry THF (30 mL) was added 1M LiHMDS in THF (22.85 mL, 22.85 mmol) at 0° C. and stirred at RT for 2 h. After completion of the reaction by TLC, the reaction mixture was quenched with aq. NH$_4$C$_1$ solution (30 mL) and extracted with ethyl acetate (2×50 mL). The combined organic layer was washed with water (50 mL), brine (50 mL), dried over anhydrous Na$_2$SO$_4$, filtered and concentrated under reduced pressure. The crude residue was purified by flash column chromatography (Silica gel, 100-200 mesh) using EtOAc in pet ether (12%) to amide (29).

TABLE-3

| Amides | Qty of Acid/Ester (mmol) | Amine Qty (mmol) | Reaction Method/ Purification | Analytical Data m/z [M + H]+ |
|---|---|---|---|---|
| 23<br>100 mg (54% Yield)<br>(1-methylpiperidin-4-yl / 2,2-dimethyl-8-bromo-chromene-6-carboxamide with N-(4-CO2Et-3-F-phenyl)) | 17<br>130 mg<br>(0.34) | ethyl 4-amino-2-fluorobenzoate<br>63 mg (0.34) | Method-5/<br>Method-D | 544.9 |
| 24<br>90 mg (30% Yield)<br>(4-isopropyl-2,2-dimethyl-8-bromo-chromene-6-carboxamide) | 18<br>200 mg<br>(0.62) | ethyl 4-amino-2-fluorobenzoate<br>120 mg (0.62) | Method-5/<br>Method-A | 490.0 |
| 25<br>110 mg (38% Yield)<br>(4-(tetrahydro-2H-pyran-4-yl)-2,2-dimethyl-8-bromo-chromene-6-carboxamide) | 19<br>200 mg<br>(0.55) | ethyl 4-amino-2-fluorobenzoate<br>100 mg (0.55) | Method-5/<br>Method-A | 530.0 |
| 26<br>210 mg (31% Yield)<br>(4-(4-methylcyclohexyl)-2,2-dimethyl-8-bromo-chromene-6-carboxamide) | 20<br>500 mg<br>(1.32) | ethyl 4-amino-2-fluorobenzoate<br>289 mg (1.32) | Method-5/<br>Chiral-SFC<br>Crude<br>~30% (cis) +<br>60% (trans) | 543.9 |

TABLE-3-continued

| Amides | Qty of Acid/Ester (mmol) | Amine Qty (mmol) | Reaction Method/ Purification | Analytical Data m/z [M + H]+ |
|---|---|---|---|---|
| 27<br>85 mg (12% Yield) | | | | 543.9 |
| 28<br>450 mg (63% Yield) | 21<br>500 mg<br>(1.55) | F-C6H3(COOEt)(NH2)<br>343 mg (1.87) | Method-5/<br>Method-A | 485.8 |
| 29<br>1.1 g (53% Yield) | 15<br>1.6 g<br>(3.8) | F-C6H3(COOEt)(NH2)<br>1.045 g (5.714) | Method-6 | 558.35 |
| 30<br>149 mg (35% Yield) | 22<br>300 mg<br>(0.76) | F-C6H3(COOEt)(NH2) | Method-5/<br>Chiral-SFC<br>Crude<br>~30% (cis) +<br>60% (trans) | 557.1 |

TABLE-3-continued

| Amides | Qty of Acid/Ester (mmol) | Amine Qty (mmol) | Reaction Method/ Purification | Analytical Data m/z [M + H]+ |
|---|---|---|---|---|
| 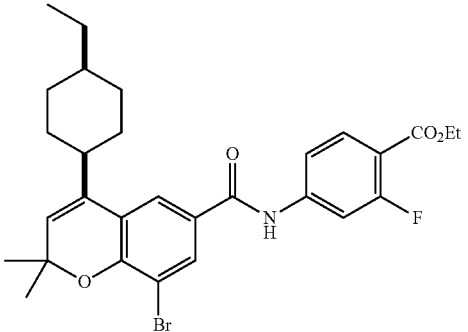<br>31<br>51 mg (12% Yield) | | | | 557.1 |

General Procedure for Ester Hydrolysis (Table-4):

Method-4: To ethyl ester dissolved in a solvent mixture of EtOH-THF-H$_2$O (1:1:1) LiOH·H$_2$O (5 eq) was added and the resulting reaction mixture was stirred at 40-50° C. for 16 h (monitored by TLC). The solvent was removed under reduced pressure, the residue was diluted with water and washed with diethyl ether (lx). The aqueous layer was adjusted to pH~3-4 using 10% aqueous citric acid and the precipitated solids were collected by filtration and dried under high vacuum.

TABLE-4

| Compound | Qty of ester (mmol) | Reaction Method/ Purification | Analytical Data m/z [M + H]+ |
|---|---|---|---|
| 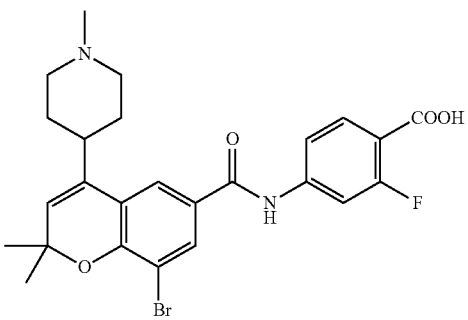<br>32<br>42 mg (44%) | 23<br>100 mg<br>(0.18) | Method-4/<br>Method-C | 516.9 |
| 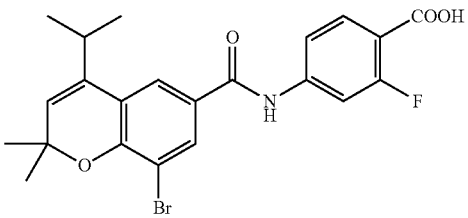<br>33<br>70 mg (82%) | 24<br>90 mg<br>(0.18) | Method-4/<br>Method-B | 461.9 |

TABLE-4-continued

| Compound | Qty of ester (mmol) | Reaction Method/ Purification | Analytical Data m/z [M + H]+ |
|---|---|---|---|
| 34 50 mg (52% Yield) | 25 100 mg (0.19) | Method-4/ Method-B | 503.9 |
| 35 60 mg (53%) | 26 120 mg (0.22) | Method-4/ Method-B | 514.0 |
| 36 25 mg (31%) | 27 (Cis isomer) 85 mg (0.16) | Method-4/ Method-B | 515.9 |
| 37 70 mg (30% Yield) | 28 250 mg (0.52) | Method-4/ Method-B | 458.0 |

TABLE-4-continued

| Compound | Qty of ester (mmol) | Reaction Method/ Purification | Analytical Data m/z [M + H]+ |
|---|---|---|---|
| 38<br>100 mg (62% Yield) | 29<br>170 mg<br>(0.304 mmol) | Method-4/<br>Method-B | 530.03 |
| 39<br>50 mg (53% Yield) | 30<br>100 mg<br>(0.179 mmol) | Method-4/<br>Method-B | 530.03 |
| 40<br>14 mg (30% Yield) | 31<br>50 mg<br>(0.089 mmol) | Method-4/<br>Method-B | 530.03 |

Transcriptional assays for RARα, RARβ and RARγ, which measure the antagonist or agonist like activity of the compounds are described in WO 2017/201200 A1 (Thacher, Crowe, Tao and Raheja, Therapeutic compositions containing RAR-alpha antagonists) published on Nov. 23, 2017, which is also incorporated herein by reference. The results obtained in these assays are expressed as EC50 values when measuring agonist activity and IC50 values when measuring antagonist activity in the presence of 0.5 nM TTNPB, a retinoid agonist. Table 5 below shows the results of the RARα, RARβ and RARγ assays for certain exemplary compounds of the disclosure.

TABLE 5

| Compound Number | Agonist Activity | | | Antagonist Activity | | | |
|---|---|---|---|---|---|---|---|
| | RARα EC50 | RARβ EC50 | RARγ EC50 | RARα IC50 | RARα Efficacy | RARβ IC50 | RARγ IC50 |
| 32 | * | * | * | * | | * | * |
| 33 | ***** | *** | ** | * | | * | * |
| 34 | ** | ** | ** | *** | † | * | * |
| 35 | * | * | * | ***** | † | *** | * |
| 36 | * | * | * | ***** | † | * | * |
| 37 | *** | ** | * | **** | | * | * |
| 38 | * | * | * | ***** | † | *** | *** |
| 39 | * | * | * | ***** | † | ** | ** |
| 40 | * | * | * | ***** | † | * | * |

Activity of compounds in RAR transcriptional assays. ***, <1 nM; , 1-10 nM; *, 11-100 nM; **, 101-1000; *, >1000 nM. Antagonist activity was determined in the presence of 0.5 nM TTNPB. †, RARα antagonist efficacy >85%.

Administration and Pharmaceutical Compositions

Administration of the compounds disclosed herein or the pharmaceutically acceptable salts, esters or tautomers thereof can be via any of the accepted modes of administration for agents that serve similar utilities including, but not limited to, orally, subcutaneously, intravenously, intranasally, topically, transdermally, intraperitoneally, intramuscularly, intrapulmonarilly, vaginally, rectally, or intraocularly. Oral and parenteral administrations are customary in treating the indications that are the subject of the preferred embodiments.

The compounds useful as described above can be formulated into pharmaceutical compositions for use in treatment of these conditions. Standard pharmaceutical formulation techniques are used, such as those disclosed in Remington's The Science and Practice of Pharmacy, 21st Ed., Lippincott Williams & Wilkins (2005), incorporated herein by reference in its entirety. Accordingly, some embodiments include pharmaceutical compositions comprising: (a) a safe and therapeutically effective amount of a compound described herein (including enantiomers, diastereoisomers, tautomers, polymorphs, and solvates thereof), or pharmaceutically acceptable salts or esters thereof; and (b) a pharmaceutically acceptable carrier, diluent, excipient or combination thereof.

The term "pharmaceutically acceptable carrier" or "pharmaceutically acceptable excipient" includes any and all solvents, dispersion media, coatings, antibacterial and antifungal agents, isotonic and absorption delaying agents and the like. The use of such media and agents for pharmaceutically active substances is well known in the art. Except insofar as any conventional media or agent is incompatible with the active ingredient, its use in the therapeutic compositions is contemplated. In addition, various adjuvants such as are commonly used in the art may be included. Considerations for the inclusion of various components in pharmaceutical compositions are described, e.g., in Gilman et al. (Eds.) (1990); Goodman and Gilman's: The Pharmacological Basis of Therapeutics, 8th Ed., Pergamon Press, which is incorporated herein by reference in its entirety.

Some examples of substances, which can serve as pharmaceutically-acceptable carriers or components thereof, are sugars, such as lactose, glucose and sucrose; starches, such as corn starch and potato starch; cellulose and its derivatives, such as sodium carboxymethyl cellulose, ethyl cellulose, and methyl cellulose; powdered tragacanth; malt; gelatin; talc; solid lubricants, such as stearic acid and magnesium stearate; calcium sulfate; vegetable oils, such as peanut oil, cottonseed oil, sesame oil, olive oil, corn oil and oil of theobroma; polyols such as propylene glycol, glycerine, sorbitol, mannitol, and polyethylene glycol; alginic acid; emulsifiers, such as the TWEENS; wetting agents, such sodium lauryl sulfate; coloring agents; flavoring agents; tableting agents, stabilizers; antioxidants; preservatives; pyrogen-free water; isotonic saline; and phosphate buffer solutions.

The choice of a pharmaceutically-acceptable carrier to be used in conjunction with the subject compound is basically determined by the way the compound is to be administered.

The compositions described herein are preferably provided in unit dosage form. As used herein, a "unit dosage form" is a composition containing an amount of a compound that is suitable for administration to an animal, preferably mammal subject, in a single dose, according to good medical practice. The preparation of a single or unit dosage form however, does not imply that the dosage form is administered once per day or once per course of therapy. Such dosage forms are contemplated to be administered once, twice, thrice or more per day and may be administered as infusion over a period of time (e.g., from about 30 minutes to about 2-6 hours), or administered as a continuous infusion, and may be given more than once during a course of therapy, though a single administration is not specifically excluded. The skilled artisan will recognize that the formulation does not specifically contemplate the entire course of therapy and such decisions are left for those skilled in the art of treatment rather than formulation.

The compositions useful as described above may be in any of a variety of suitable forms for a variety of routes for administration, for example, for oral, nasal, rectal, topical (including transdermal), ocular, intracerebral, intracranial, intrathecal, intra-arterial, intravenous, intramuscular, or other parental routes of administration. The skilled artisan will appreciate that oral and nasal compositions include compositions that are administered by inhalation, and made using available methodologies. Depending upon the particular route of administration desired, a variety of pharmaceutically-acceptable carriers well-known in the art may be used. Pharmaceutically-acceptable carriers include, for example, solid or liquid fillers, diluents, hydrotropies, surface-active agents, and encapsulating substances. Optional pharmaceutically-active materials may be included, which do not substantially interfere with the inhibitory activity of the compound. The amount of carrier employed in conjunction with the compound is sufficient to provide a practical quantity of material for administration per unit dose of the compound. Techniques and compositions for making dosage forms useful in the methods described herein are described in the following references, all incorporated by reference herein: Modern Pharmaceutics, 4th Ed., Chapters 9 and 10 (Banker & Rhodes, editors, 2002); Lieberman et al., Pharmaceutical Dosage Forms: Tablets (1989); and Ansel, Introduction to Pharmaceutical Dosage Forms 8th Edition (2004).

Various oral dosage forms can be used, including such solid forms as tablets, capsules, granules and bulk powders. Tablets can be compressed, tablet triturates, enteric-coated, sugar-coated, film-coated, or multiple-compressed, containing suitable binders, lubricants, diluents, disintegrating agents, coloring agents, flavoring agents, flow-inducing agents, and melting agents. Liquid oral dosage forms include aqueous solutions, emulsions, suspensions, solutions and/or suspensions reconstituted from non-effervescent granules, and effervescent preparations reconstituted from effervescent granules, containing suitable solvents, preservatives, emulsifying agents, suspending agents, diluents, sweeteners, melting agents, coloring agents and flavoring agents.

The pharmaceutically-acceptable carriers suitable for the preparation of unit dosage forms for peroral administration is well-known in the art. Tablets typically comprise conventional pharmaceutically-compatible adjuvants as inert diluents, such as calcium carbonate, sodium carbonate, mannitol, lactose and cellulose; binders such as starch, gelatin and sucrose; disintegrants such as starch, alginic acid and croscarmelose; lubricants such as magnesium stearate, stearic acid and talc. Glidants such as silicon dioxide can be used to improve flow characteristics of the powder mixture. Coloring agents, such as the FD&C dyes, can be added for appearance. Sweeteners and flavoring agents, such as aspartame, saccharin, menthol, peppermint, and fruit flavors, are useful adjuvants for chewable tablets. Capsules typically comprise one or more solid diluents disclosed above. The selection of carrier components depends on secondary considerations like taste, cost, and shelf stability, which are not critical, and can be readily made by a person skilled in the art.

Peroral compositions also include liquid solutions, emulsions, suspensions, and the like. The pharmaceutically-acceptable carriers suitable for preparation of such compositions are well known in the art. Typical components of carriers for syrups, elixirs, emulsions and suspensions include ethanol, glycerol, propylene glycol, polyethylene glycol, liquid sucrose, sorbitol and water. For a suspension, typical suspending agents include methyl cellulose, sodium carboxymethyl cellulose, AVICEL RC-591, tragacanth and sodium alginate; typical wetting agents include lecithin and polysorbate 80; and typical preservatives include methyl paraben and sodium benzoate. Peroral liquid compositions may also contain one or more components such as sweeteners, flavoring agents and colorants disclosed above.

Such compositions may also be coated by conventional methods, typically with pH or time-dependent coatings, such that the subject compound is released in the gastrointestinal tract in the vicinity of the desired topical application, or at various times to extend the desired action. Such dosage forms typically include, but are not limited to, one or more of cellulose acetate phthalate, polyvinylacetate phthalate, hydroxypropyl methyl cellulose phthalate, ethyl cellulose, Eudragit coatings, waxes and shellac.

Compositions described herein may optionally include other drug actives.

Other compositions useful for attaining systemic delivery of the subject compounds include sublingual, buccal and nasal dosage forms. Such compositions typically comprise one or more of soluble filler substances such as sucrose, sorbitol and mannitol; and binders such as acacia, microcrystalline cellulose, carboxymethyl cellulose and hydroxypropyl methyl cellulose. Glidants, lubricants, sweeteners, colorants, antioxidants and flavoring agents disclosed above may also be included.

A liquid composition, which is formulated for topical ophthalmic use, is formulated such that it can be administered topically to the eye. The comfort may be maximized as much as possible, although sometimes formulation considerations (e.g. drug stability) may necessitate less than optimal comfort. In the case that comfort cannot be maximized, the liquid may be formulated such that the liquid is tolerable to the patient for topical ophthalmic use. Additionally, an ophthalmically acceptable liquid may either be packaged for single use, or contain a preservative to prevent contamination over multiple uses.

For ophthalmic application, solutions or medicaments are often prepared using a physiological saline solution as a major vehicle. Ophthalmic solutions may preferably be maintained at a comfortable pH with an appropriate buffer system. The formulations may also contain conventional, pharmaceutically acceptable preservatives, stabilizers and surfactants.

Preservatives that may be used in the pharmaceutical compositions disclosed herein include, but are not limited to, benzalkonium chloride, PHMB, chlorobutanol. thimerosal, phenylmercuric, acetate and phenylmercuric nitrate. A useful surfactant is, for example, Tween 80. Likewise, various useful vehicles may be used in the ophthalmic preparations disclosed herein. These vehicles include, but are not limited to, polyvinyl alcohol, povidone, hydroxypropyl methyl cellulose, poloxamers, carboxymethyl cellulose, hydroxyethyl cellulose and purified water.

Tonicity adjustors may be added as needed or convenient. They include, but are not limited to, salts, particularly sodium chloride, potassium chloride, mannitol and glycerin, or any other suitable ophthalmically acceptable tonicity adjustor.

Various buffers and means for adjusting pH may be used so long as the resulting preparation is ophthalmically acceptable. For many compositions, the pH will be between 4 and 9. Accordingly, buffers include acetate buffers, citrate buffers, phosphate buffers and borate buffers. Acids or bases may be used to adjust the pH of these formulations as needed.

In a similar vein, an ophthalmically acceptable antioxidant includes, but is not limited to, sodium metabisulfite, sodium thiosulfate, acetylcysteine, butylated hydroxyanisole and butylated hydroxytoluene.

Other excipient components, which may be included in the ophthalmic preparations, are chelating agents. A useful chelating agent is edetate disodium, although other chelating agents may also be used in place or in conjunction with it.

For topical use, creams, ointments, gels, solutions or suspensions, etc., containing the compound disclosed herein are employed. Topical formulations may generally be comprised of a pharmaceutical carrier, co-solvent, emulsifier, penetration enhancer, preservative system, and emollient.

For intravenous administration, the compounds and compositions described herein may be dissolved or dispersed in a pharmaceutically acceptable diluent, such as a saline or dextrose solution. Suitable excipients may be included to achieve the desired pH, including but not limited to NaOH, sodium carbonate, sodium acetate, HCl, and citric acid. In various embodiments, the pH of the final composition ranges from 2 to 8, or preferably from 4 to 7. Antioxidant excipients may include sodium bisulfite, acetone sodium bisulfite, sodium formaldehyde, sulfoxylate, thiourea, and EDTA. Other non-limiting examples of suitable excipients found in the final intravenous composition may include sodium or potassium phosphates, citric acid, tartaric acid, gelatin, and carbohydrates such as dextrose, mannitol, and dextran. Further acceptable excipients are described in Powell, et al., Compendium of Excipients for Parenteral Formulations, *PDA J Pharm Sci and Tech* 1998, 52 238-311 and Nema et al., Excipients and Their Role in Approved Injectable Products: Current Usage and Future Directions, *PDA J Pharm Sci and Tech* 2011, 65 287-332, both of which are incorporated herein by reference in their entirety. Antimicrobial agents may also be included to achieve a bacteriostatic or fungistatic solution, including but not limited to phenylmercuric nitrate, thimerosal, benzethonium chloride, benzalkonium chloride, phenol, cresol, and chlorobutanol.

The compositions for intravenous administration may be provided to caregivers in the form of one more solids that are reconstituted with a suitable diluent such as sterile water, saline or dextrose in water shortly prior to administration. In other embodiments, the compositions are provided in solution ready to administer parenterally. In still other embodiments, the compositions are provided in a solution that is further diluted prior to administration. In embodiments that include administering a combination of a compound described herein and another agent, the combination may be provided to caregivers as a mixture, or the caregivers may mix the two agents prior to administration, or the two agents may be administered separately.

The actual dose of the active compounds described herein depends on the specific compound, and on the condition to be treated; the selection of the appropriate dose is well within the knowledge of the skilled artisan. In some embodiments, a daily dose may be from about 0.25 mg/kg to about 120 mg/kg or more of body weight, from about 0.5 mg/kg or less to about 70 mg/kg, from about 1.0 mg/kg to about 50 mg/kg of body weight, or from about 1.5 mg/kg to about 10 mg/kg of body weight. Thus, for administration to a 70 kg person, the dosage range would be from about 17 mg per day to about 8000 mg per day, from about 35 mg per day or less to about 7000 mg per day or more, from about 70 mg per day to about 6000 mg per day, from about 100 mg per day to about 5000 mg per day, or from about 200 mg to about 3000 mg per day.

Methods of Treatment

Some embodiments of the present invention include methods of treating inflammatory diseases and cancer with the compounds and compositions comprising compounds described herein. Some methods include administering a compound, composition, pharmaceutical composition described herein to a subject in need thereof. In some embodiments, a subject can be an animal, e.g., a mammal, a human.

In some embodiments, the subject is a human.

Further embodiments include administering a combination of compounds to a subject in need thereof. A combination can include a compound, composition, pharmaceutical composition described herein with an additional medicament.

Some embodiments include co-administering a compound, composition, and/or pharmaceutical composition described herein, with an additional medicament. By "co-administration," it is meant that the two or more agents may be found in the patient's bloodstream at the same time, regardless of when or how they are actually administered. In one embodiment, the agents are administered simultaneously. In one such embodiment, administration in combination is accomplished by combining the agents in a single dosage form. In another embodiment, the agents are administered sequentially. In one embodiment the agents are administered through the same route, such as orally. In another embodiment, the agents are administered through different routes, such as one being administered orally and another being administered i.v.

To further illustrate this invention, the following examples are included. The examples should not, of course, be construed as specifically limiting the invention. Variations of these examples within the scope of the claims are within the purview of one skilled in the art and are considered to fall within the scope of the invention as described, and claimed herein. The reader will recognize that the skilled artisan, armed with the present disclosure, and skill in the art is able to prepare and use the invention without exhaustive examples.

Examples

Biological Activity

It is another object of the disclosure to provide new compounds and compositions which may act as selective RARα modulators, methods for their manufacture, and methods for their use, including for the treatment and/or prevention of diseases where elevated retinoic acid may be a pathogenic factor, such as the inflammatory bowel disorders Crohn's disease and ulcerative colitis and other disorders where uncontrolled inflammation causes damage to the lining of the intestine, such as Behcet's enterocolitis and immune checkpoint inhibitor enterocolitis. Other examples may include celiac disease, human immunodeficiency virus infection or graft-versus-host disease. In some embodiments, the compounds may be used for the selective inhibition or antagonism of RARα.

Inhibition of α4β7 Expression in CD4+ and CD8+ T Cells

During inflammation, α4β7 can be induced in activated CD4+ and CD8+ T cells. The induction depends in part on release of retinoic acid by dendritic cells in mesenteric lymph nodes. This induction can also be modeled in vitro by the addition of retinoic acid to differentiating T lymphocytes, which induces expression of α4β7 (Iwata, et al., 2004; Villablanca and Mora, 2011). The ability of an RARα antagonist to block the expression of α4β7 on CD4+ or CD8+ T lymphocytes suggests that such an antagonist could function in a mammal to block the migration of activated T cells to the intestine.

Effect of RARα Antagonist on T Cell α4β7 Expression In Vitro.

T cells activated in the presence of RA or RAR-agonists will upregulate α4β7 and will become gut-tropic T cells (Iwata, et al., 2004; Villablanca and Mora, 2011). Provided herein are methods for blocking α4β7 expression on T cells in vitro by treatment with RARα antagonists during activation.

Spleen cells are isolated from wild type mice, resuspended in PBS and centrifuged for 5 min at 400×g. Red blood cells are lysed in 4 mL of ACK lysis buffer for 2-3 minutes then 5 mL of PBS is added and the cells centrifuged for 5 min at 400×g. The cell pellet is resuspended at $1 \times 10^6$ cells/mL in IMDM+10% FBS+50 mM 2-mercaptoethanol+ penicillin/streptomycin (complete IMDM). The cells are cultured in 24-well plates previously coated with anti-CD3 and anti-CD28 (10 μg/mL) and incubated at 37° C. in 5% $CO_2$. One set of wells is supplemented with atRA (or synthetic RAR-agonists, such as TTNPB or Am580) to a final concentration of 100-200 nM. After 2-3 days the cell suspension is transferred into a new uncoated 24-well plates and incubated for an additional 2-3 days. Cells are collected and analyzed for α4β7 expression by flow cytometry by incubating with fluorochrome-labeled antibodies to CD4, CD8, and α4β7 (eBioscience, San Diego, CA) for 15 min at 4° C. in dark. After the incubation, cells are centrifuged for 5 min at 300 g 4° C., washed and resuspended in staining buffer and analyze by FACS. Co-culture with an RARα antagonist is predicted to inhibit α4β7 expression on T cells.

Pretreatment of human or other mammalian T cells in culture by an RARα-specific antagonist is carried out by similar methods with species-specific reagents as a method to evaluate the effect of RARα antagonists on α4β7 expression during T cell activation.

Effect of RARα Antagonist on α4β7 Expression in T Cells In Vivo.

Total spleen cells are isolated from OT-II/Rag2$^{-/-}$ mice (OT-II, CD45.2) and centrifuged 300×g for 5 min Red blood cells are removed by lysis in 2 mL ACK lysis buffer for 3 min at room temperature. Cells are then washed with IMDM, centrifuged and resuspended in 10 mL complete IMDM.

T cells are isolated from total spleen cells using the Pan T cell isolation Kit II, mouse (Miltenyi #130-095-130). On Day 0 3×10$^6$ OT-II T cells are injected intravenously (by a retro-orbital route) into C57BL/6 (CD45.1) recipient mice. On Day 1 mice are immunized orally with 50 mg ovalbumin and 10 µg R848 (InvivoGen) in water. RARα antagonist (at 10 mg/kg or an appropriate dose) or vehicle control (5% DMSO, 95% hydroxypropyl-β-cyclodextrin) is administered by daily oral gavage on Day 1, 2 and 3. On Day 4, mice are euthanized and spleen, mesenteric lymph nodes, and small intestine lamina propria lymphocytes are isolated and analyzed by flow cytometry using fluorochrome-conjugated antibodies to α4β7, CD45.1, CD45.2, CD3, CD4, CD8, CD44 (eBioscience).

Treatment with an RARα antagonist is predicted to inhibit expression of α4β7 on CD45.2+CD3+CD4+CD44hi T cells compared to vehicle-treated mice.

Effect of RARα Antagonist on Spermatogenesis In Vivo.

Treatment with an RARα antagonist is predicted to disrupt spermatogenesis and impair fertility in mice. Male CD-1 mice are administered an RARα antagonist (at 10 mg/kg or an appropriate dose) or vehicle control (5% DMSO, 95% hydroxypropyl-β-cyclodextrin) by daily oral gavage for up to 30 days. Testicular histology is evaluated up to 90 days after cessation of treatment. Testes are dissected, weighed and fixed in neutral buffered formalin overnight at 4° C. Fixed tissues are embedded in paraffin, sectioned, stained with hematoxylin and eosin and examined by brightfield microscopy.

Fertility is assessed by placing males in individual cage with two untreated virgin females of the same strain for 14 days (three estrous cycles). The female mice are replaced with two additional females continuously until either fertility is restored (determined by observation of at least 3 consecutive pregnancies) or the mice reached at least six months after dose.

Although the invention has been described with reference to embodiments and examples, it should be understood that numerous and various modifications can be made without departing from the spirit of the invention. Accordingly, the invention is limited only by the following claims.

REFERENCES

The following references to the extent that they provide exemplary procedural or other details supplementary to those set forth herein, are specifically incorporated herein by reference.

Aoyama K, Saha A, Tolar J, Riddle M J, Veenstra R G, Taylor P A, et al. (2013). Inhibiting retinoic acid signaling ameliorates graft-versus-host disease by modifying T-cell differentiation and intestinal migration. Blood 122: 2125-2134.

Arthos J, Cicala C, Nawaz F, Byrareddy S N, Villinger F, Santangelo P J, et al. (2018). The Role of Integrin alpha4beta7 in HIV Pathogenesis and Treatment. Curr HIV/AIDS Rep 15: 127-135.

Chen X, Dodge J, Komorowski R, & Drobyski W R (2013). A critical role for the retinoic acid signaling pathway in the pathophysiology of gastrointestinal graft-versus-host disease. Blood 121: 3970-3980.

Chung S S, Sung W, Wang X & Wolgemuth D J (2004). Retinoic acid receptor a is required for synchronization of spermatogenic cycles and its absence results in progressive breakdown of the spermatogenic process. Dev. Dyn. 230:754-766.

Chung S S, Wang X, Roberts S S, Griffey S M, Reczek P R, & Wolgemuth D J (2011). Oral administration of a retinoic acid receptor antagonist reversibly inhibits spermatogenesis in mice. Endocrinology 152: 2492-2502.

Chung S S, Cuellar R A, Wang X, Reczek P R, Georg G I and Wolgemuth D J (2013). Pharmacological activity of retinoic acid receptor alpha-selective antagonists in vitro and in vivo. ACS Med. Chem. Lett. 4:446-450.

Chung S S, Wang X, & Wolgemuth D J (2016). Prolonged Oral Administration of a Pan-Retinoic Acid Receptor Antagonist Inhibits Spermatogenesis in Mice With a Rapid Recovery and Changes in the Expression of Influx and Efflux Transporters. Endocrinology 157: 1601-1612.

Clagett-Dame M, & Knutson D (2011). Vitamin A in Reproduction and Development. Nutrients 3: 385-428.

Coombes J L, Siddiqui K R, Arancibia-Carcamo C V, Hall J, Sun C M, Belkaid Y, et al. (2007). A functionally specialized population of mucosal CD103+DCs induces Foxp3+ regulatory T cells via a TGF-beta and retinoic acid-dependent mechanism. J Exp Med 204: 1757-1764.

Crockett S D, Porter C Q, Martin C F, Sandler R S, & Kappelman M D (2010). Isotretinoin use and the risk of inflammatory bowel disease: a case-control study. Am J Gastroenterol 105: 1986-1993.

Daponte A, Kostopoulou E, Papandreou C N, Chiotoglou I, Voutsadakis I, Vanakara P, et al. (2007). Retinoid receptor alpha and Beta expression in serous ovarian tumors. Oncology 73: 81-89.

DePaolo R W, Abadie V, Tang F, Fehlner-Peach H, Hall J A, Wang W, et al. (2011). Co-adjuvant effects of retinoic acid and IL-15 induce inflammatory immunity to dietary antigens. Nature 471: 220-224.

Diana P. Mankongpaisarnrung C, Atkins M B, Zeck J C, & Charabaty A (2018). Emerging Role of Vedolizumab in Managing Refractory Immune Checkpoint Inhibitor-Induced Enteritis. ACG Case Rep J 5: e17.

Dodge J, Stephans A, Lai J, Drobyski W R, & Chen X (2016). Effects of Donor Vitamin A Deficiency and Pharmacologic Modulation of Donor T Cell Retinoic Acid Pathway on the Severity of Experimental Graft-versus-Host Disease. Biology of blood and marrow transplantation: journal of the American Society for Blood and Marrow Transplantation 22: 2141-2148.

Eksteen B, Mora J R, Haughton E L, Henderson N C, Lee-Turner L, Villablanca E J, et al, (2009). Gut homing receptors on CD8 T cells are retinoic acid dependent and not maintained by liver dendritic or stellate cells. Gastroenterology 137: 320-329.

Fransen K, Franzen P, Magnuson A, Elmabsout A A, Nyhlin N, Wickbom A, et al. (2013). Polymorphism in the retinoic acid metabolizing enzyme CYP26B1 and the development of Crohn's Disease. PLoS One 8: e72739.

Galvin K C, Dyck L, Marshall N A, Stefanska A M, Walsh K P, Moran B, et al. (2013). Blocking retinoic acid receptor-alpha enhances the efficacy of a dendritic cell vaccine against tumours by suppressing the induction of regulatory T cells. Cancer Immunol Immunother 62: 1273-1282.

Guo Y, Brown C, Ortiz C, & Noelle R J (2015). Leukocyte homing, fate, and function are controlled by retinoic acid. Physiol Rev 95: 125-148.

Guo Y, Lee Y C, Brown C, Zhang W, Usherwood E, & Noelle R J (2014). Dissecting the role of retinoic acid receptor isoforms in the CD8 response to infection J Immunol 192: 3336-3344.

Guo Y, Pino-Lagos K, Ahonen C A, Bennett K A, Wang J, Napoli J L, et al. (2012). A retinoic acid-rich tumor microenvironment provides clonal survival cues for tumor-specific CD8(+) T cells. Cancer Res 72: 5230-5239.

Hall Jason A, Cannons Jennifer L, Grainger John R, Dos Santos Liliane M, Hand Timothy W, Naik S, et al. (2011). Essential Role for Retinoic Acid in the Promotion of CD4+ T Cell Effector Responses via Retinoic Acid Receptor Alpha Immunity 34: 435-447.

Heller C G, Moore D J & Paulsen C A (1961). Suppression of Spermatogenesis and Chronic Toxicity in Men by a New Series of Bis(dichloroacetyl) Diamines Toxicol. Appl. Pharm. 3:1-11.

Hill J A, Hall J A, Sun C M, Cai Q, Ghyselinck N, Chambon P, et al. (2008). Retinoic acid enhances Foxp3 induction indirectly by relieving inhibition from CD4+CD44hi Cells. Immunity 29: 758-770.

Hong Y, Manoharan I, Suryawanshi A, Majumdar T, Angus-Hill M L, Koni P A, et al. (2015). beta-catenin promotes regulatory T-cell responses in tumors by inducing vitamin A metabolism in dendritic cells. Cancer Res 75: 656-665.

Hsieh A H, Ferman M, Brown M P, & Andrews J M (2016). Vedolizumab: a novel treatment for ipilimumab-induced colitis. BMJ Case Rep 2016.

Iwata M, Hirakiyama A, Eshima Y, Kagechika H, Kato C, & Song S Y (2004). Retinoic acid imprints gut-homing specificity on T cells. Immunity 21: 527-538.

Kang S G, Wang C, Matsumoto S, & Kim C H (2009). High and low vitamin A therapies induce distinct FoxP3+ T-cell subsets and effectively control intestinal inflammation. Gastroenterology 137: 1391-1402 e1391-1396.

Klein E S, Pino M E, Johnson A T, Davies P J, Nagpal S, Thacher S M, Krasinski G & Chandraratna R A (1996). Identification and functional separation of retinoic acid receptor neutral antagonists and inverse agonists. J Biol Chem. 271:22692-22696.

Lopalco G, Rigante D, Venerito V, Fabiani C, Franceschini R, Barone M, et al. (2017). Update on the Medical Management of Gastrointestinal Behcet's Disease. Mediators Inflamm 2017: 1460491.

Lufkin T, Lohnes D, Mark M, et al. (1993). High postnatal lethality and testis degeneration in retinoic acid receptor alpha mutant mice. Proc. Natl. Acad. Sci. USA. 90:7225.

Napoli J L (2012). Physiological insights into all-trans-retinoic acid biosynthesis. Biochim Biophys Acta 1821: 152-167.

Navarini A A, Hruz P, Berger C T, Hou T Z, Schwab C, Gabrysch A, et al. (2017). Vedolizumab as a successful treatment of CTLA-4-associated autoimmune enterocolitis. J Allergy Clin Immunol 139: 1043-1046 e1045.

Nawaz F, Goes L R, Ray J C, Olowojesiku R, Sajani A, Ansari A A, et al. (2018). MAdCAM costimulation through Integrin-alpha4beta7 promotes HIV replication. Mucosal immunology.

Paul S, Williet N, Di Bernado T, Berger A E, Boschetti G, Filippi J, et al. (2018). Soluble Mucosal Addressin Cell Adhesion Molecule 1 and Retinoic Acid are Potential Tools for Therapeutic Drug Monitoring in Patients with Inflammatory Bowel Disease Treated with Vedolizumab: A Proof of Concept Study. J Crohns Colitis.

Sanders T J, McCarthy N E, Giles E M, Davidson K L, Haltalli M L, Hazell S, et al. (2014). Increased production of retinoic acid by intestinal macrophages contributes to their inflammatory phenotype in patients with Crohn's disease. Gastroenterology 146: 1278-1288 e1271-1272.

Schambach F, Schupp M, Lazar Mitchell A, & Reiner Steven L (2007). Activation of retinoic acid receptor-α favours regulatory T cell induction at the expense of IL-17-secreting T helper cell differentiation. European Journal of Immunology 37: 2396-2399.

Sivro A, Schuetz A, Sheward D, Joag V, Yegorov S, Liebenberg L J, et al. (2018). Integrin alpha4beta7 expression on peripheral blood CD4(+) T cells predicts HIV acquisition and disease progression outcomes. Sci Transl Med 10.

Stevison F, Hogarth C, Tripathy S, Kent T, & Isoherranen N (2017). Inhibition of the all-trans Retinoic Acid (atRA) Hydroxylases CYP26A1 and CYP26B1 Results in Dynamic, Tissue-Specific Changes in Endogenous atRA Signaling. Drug Metab Dispos 45: 846-854.

Thacher S M, Nagpal S, Klein E S, Arefieg T, Krasinski G, DiSepio D, Agarwal C, Johnson A, Eckert R L & Chandraratna R A (1999). Cell type and gene-specific activity of the retinoid inverse agonist AGN 193109: divergent effects from agonist at retinoic acid receptor gamma in human keratinocytes. Cell Growth Differ. 10:255-62.

Thacher S M, Vasudevan J, & Chandraratna R A S (2000). Therapeutic applications for ligands of retinoid receptors. Current pharmaceutical design 6: 25-58.

Thacher S M, Crowe P D, Tao H and Raheja R, (2017) Therapeutic compositions containing RAR-alpha antagonists WO 2017/201200 A1.

Uzzan M, Tokuyama M, Rosenstein A K, Tomescu C, SahBandar I N, et al. (2018) Anti-α4β7 therapy targets lymphoid aggregates in the gastrointestinal tract of HIV-1-infected individuals. Sci. Transl. Med. 10 (461).

van der Leede B M, Geertzema J, Vroom T M, Decimo D, Lutz Y, van der Saag P T, et al. (1996) Immunohistochemical analysis of retinoic acid receptor-alpha in human breast tumors: retinoic acid receptor-alpha expression correlates with proliferative activity. Am J Pathol 148: 1905-1914.

Villablanca E J and Mora J R. (2011). Competitive homing assays to study gut-tropic t cell migration. J Vis Exp. March 1; (49). pii: 2619.

Westerveld D, Grajo J, Beattie L, & Glover S (2017). Vedolizumab: a novel medical intervention in the treatment of primary sclerosing cholangitis. BMJ Case Rep 2017.

Wolbach S B and Howe P R (1925). Tissue Changes Following Deprivation of Fat-Soluble A Vitamin. J. Exp. Med. 42:753.

What is claimed is:

1. A compound of formula (IV):

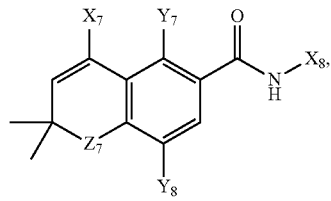

or a pharmaceutically acceptable salt thereof, wherein:

$X_7$ is 3-10 membered heterocycloalkyl, or $C_{3-8}$cycloalkyl, each optionally substituted with one to three $R^L$;

$X_8$ is $C_6$ or $C_{10}$ aryl, 5-10 membered heteroaryl, 3-10 membered heterocycloalkyl, or $C_{3-8}$cycloalkyl, each optionally substituted with one to four $R^M$;

each $R^L$ is independently halo, cyano, —C(=O)NH$_2$, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, or substituted 3-10 membered heterocycloalkyl;

each $R^M$ is independently fluoro, bromo, chloro, cyano, —C(=O)NH$_2$, —C(=O) OH, unsubstituted $C_{1-6}$alkyl, substituted $C_{1-6}$alkyl, unsubstituted $C_{1-6}$alkoxy, substituted $C_{1-6}$alkoxy, unsubstituted phenyl, substituted phenyl, unsubstituted $C_{7-12}$aralkyl, substituted $C_{7-12}$aralkyl, unsubstituted 5-10 membered heteroaryl, substituted 5-10 membered heteroaryl, unsubstituted 3-10 membered heterocycloalkyl, substituted 3-10 membered heterocycloalkyl, or an acidic moiety;

$Y_7$ is hydrogen, unsubstituted $C_{1-6}$alkyl or substituted $C_{1-6}$alkyl;

$Y_8$ is halo, cyano, unsubstituted $C_{1-6}$alkyl, unsubstituted $C_{1-6}$alkoxy, or substituted $C_{1-6}$alkoxy;

$Z_7$ is O (oxygen), S (sulfur), or $NR^N$; and $R^N$ is hydrogen, unsubstituted $C_{1-6}$alkyl or substituted $C_{1-6}$alkyl.

2. The compound of claim 1, further defined as:

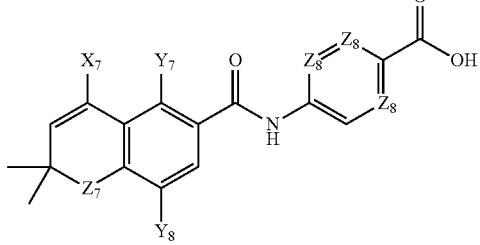

or a pharmaceutically acceptable salt thereof, wherein:

each $Z_8$ is independently N (nitrogen), CH or $CR^M$.

3. The compound of claim 2, or a pharmaceutically acceptable salt thereof, wherein $X_7$ is $C_{3-8}$cycloalkyl optionally substituted with one to three $R^L$.

4. The compound of claim 2, or a pharmaceutically acceptable salt, ester or tautomer thereof, wherein each $R^M$ is independently fluoro, bromo, chloro, cyano, —C(=O)NH$_2$, —C(=O) OH, unsubstituted $C_{1-6}$alkyl, substituted $C_{1-6}$alkyl, or unsubstituted $C_{1-6}$alkoxy.

5. The compound of claim 2, or a pharmaceutically acceptable salt thereof, wherein each $R^M$ is independently fluoro, bromo, or chloro.

6. The compound of claim 2, or a pharmaceutically acceptable salt thereof, wherein $Z_7$ is O (oxygen).

7. The compound of claim 2, or a pharmaceutically acceptable salt thereof, wherein $Y_7$ is hydrogen.

8. The compound of claim 2, or a pharmaceutically acceptable salt thereof, wherein $Y_8$ is bromo.

9. The compound of claim 2 or a pharmaceutically acceptable salt thereof, wherein each R is independently unsubstituted $C_{1-6}$alkyl or substituted $C_{1-6}$alkyl.

10. The compound of claim 1 selected from the group consisting of

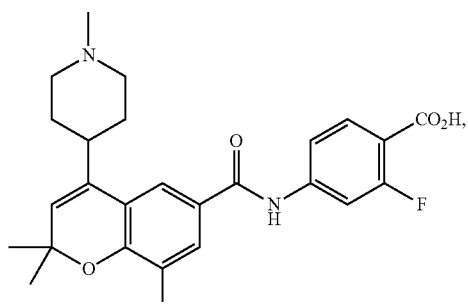

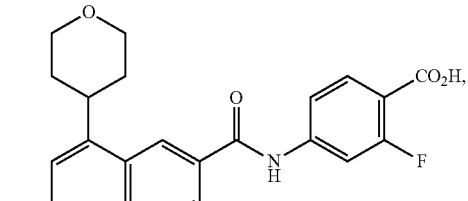

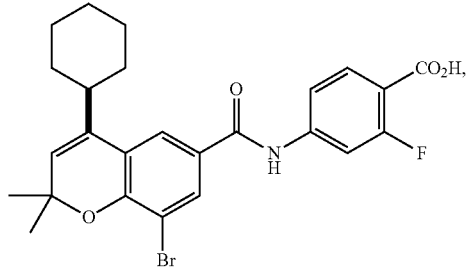

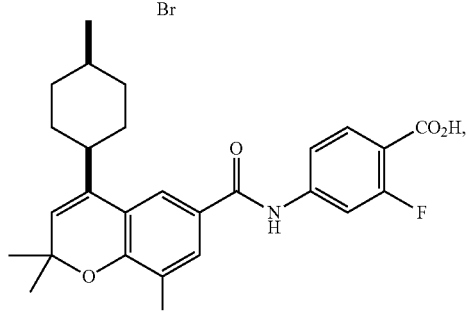

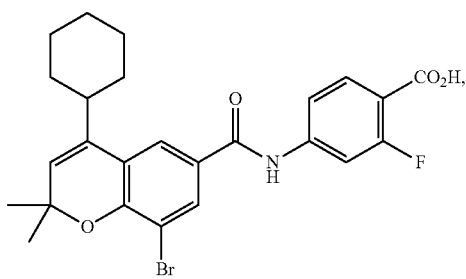

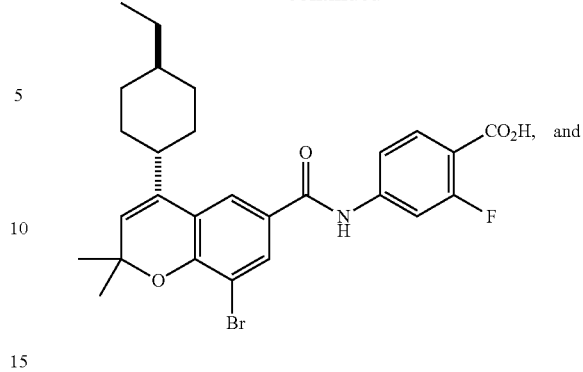

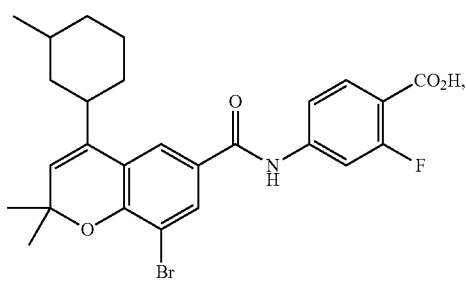

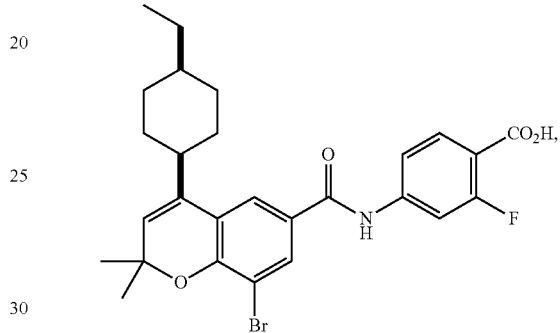

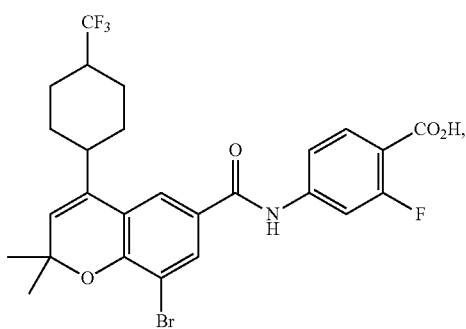

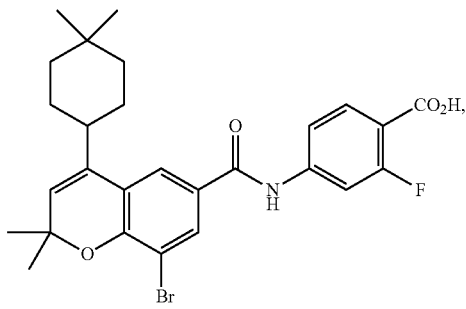

or a pharmaceutically acceptable salt thereof.

11. A pharmaceutical composition comprising a compound of claim 1, or a pharmaceutically acceptable salt thereof, further comprising a pharmaceutically acceptable carrier.

12. A method of treating cancer in a subject, comprising administering to the subject an effective amount of a compound of claim 1, or pharmaceutically acceptable salt thereof.

13. A method of treating inflammatory disease in a subject, comprising administering to the subject an effective amount of a compound of claim 1, or pharmaceutically acceptable salt thereof, wherein the inflammatory disease is inflammatory bowel disease, Crohn's disease, ulcerative colitis, or graft vs. host disease.

14. The compound of claim 1 having the structure:

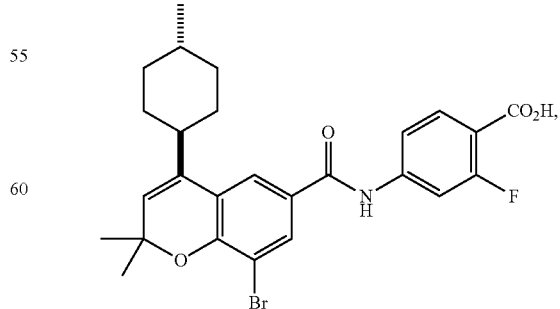

or a pharmaceutically acceptable salt thereof.

15. The compound of claim 1 having the structure:

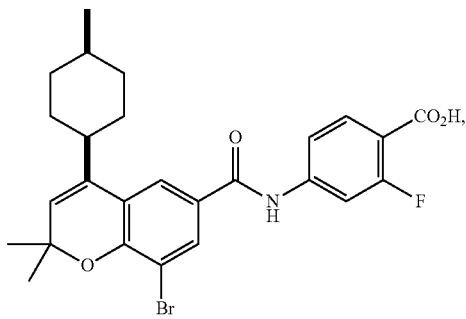

or a pharmaceutically acceptable salt thereof.

16. The compound of claim 1 having the structure:

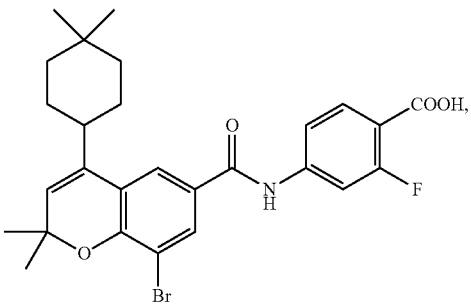 [SMILES: CC1(C)CCC(C2=CC(C)(C)Oc3c(Br)cc(C(=O)Nc4ccc(C(=O)O)c(F)c4)cc32)CC1]

or a pharmaceutically acceptable salt thereof.

17. The compound of claim 1 having the structure:

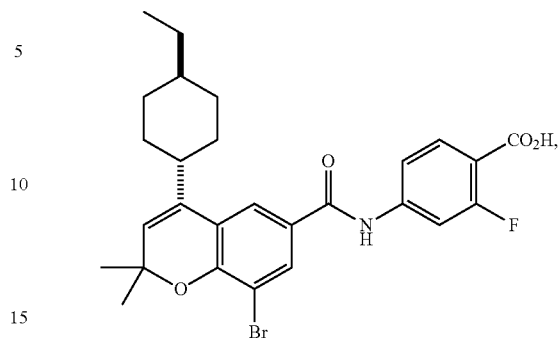

or a pharmaceutically acceptable salt thereof.

18. The compound of claim 1 having the structure:

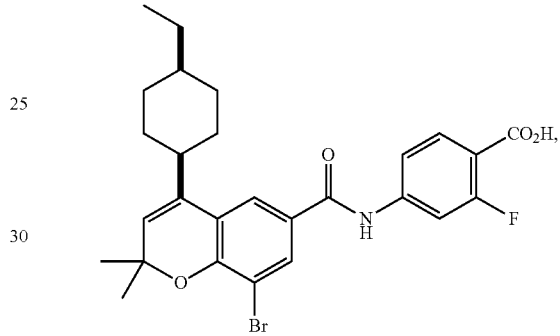

or a pharmaceutically acceptable salt thereof.

* * * * *